United States Patent
Shikii et al.

(10) Patent No.: US 8,300,291 B2
(45) Date of Patent: Oct. 30, 2012

(54) OPTICAL SCANNING DEVICE AND TWO-DIMENSIONAL IMAGE DISPLAY DEVICE USING THE SAME

(75) Inventors: Shinichi Shikii, Nara (JP); Tatsuo Itoh, Osaka (JP); Kazuhisa Yamamoto, Osaka (JP); Shinichi Kadowaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 309 days.

(21) Appl. No.: 12/529,585

(22) PCT Filed: Feb. 27, 2008

(86) PCT No.: PCT/JP2008/000370
§ 371 (c)(1), (2), (4) Date: Sep. 2, 2009

(87) PCT Pub. No.: WO2008/108068
PCT Pub. Date: Sep. 12, 2008

(65) Prior Publication Data
US 2010/0110517 A1    May 6, 2010

(30) Foreign Application Priority Data

Mar. 6, 2007 (JP) .................. 2007-055583

(51) Int. Cl.
G02B 26/08 (2006.01)
(52) U.S. Cl. .................. 359/207.1
(58) Field of Classification Search ..... 359/196.1–226.3
See application file for complete search history.

(56) References Cited

U.S. PATENT DOCUMENTS

| 6,710,316 B2* | 3/2004 | Mandella et al. ...... 250/201.3 |
| 2003/0001071 A1* | 1/2003 | Mandella et al. ...... 250/201.3 |
| 2006/0023971 A1* | 2/2006 | Takakubo ............ 382/312 |

FOREIGN PATENT DOCUMENTS

| JP | 04-100019 | 4/1992 |
| JP | 2649744 | 9/1992 |
| JP | 06-148635 | 5/1994 |
| JP | 2001-083510 | 3/2001 |
| JP | 2005-070473 | 3/2005 |

OTHER PUBLICATIONS

International Search Report dated Apr. 8, 2008 for International Application No. PCT/JP2008/000370.

* cited by examiner

Primary Examiner — Jennifer L. Doak
(74) Attorney, Agent, or Firm — Wenderoth Lind & Ponack, L.L.P.

(57) ABSTRACT

An optical scanning device includes at least one laser light source for emitting a laser light; a deflection section for deflecting and scanning the laser light emitted from the at least one laser light source; and a light guide plate of which a side surface is irradiated with the laser light deflected and scanned by the deflection section. The at least one laser light source includes a multi-mode fiber light source, or a broad-stripe semiconductor laser light source arranged such that a vertical direction of a stripe structure is parallel to a scanning direction. An exit pupil in a thickness direction, which is perpendicular to the scanning direction, is formed at least in one area on the side surface of the light guide plate.

13 Claims, 22 Drawing Sheets

OPTICAL SCANNING DEVICE AND TWO-DIMENSIONAL IMAGE DISPLAY DEVICE USING THE SAME

TECHNICAL FIELD

1. Background of the Invention

The present invention relates to an optical scanning device using a laser light source having mainly three colors (R, G, B), for use in a two-dimensional image display device such as a liquid crystal display device or the like.

2. Background Art

A display device includes a light-emitting display device such as an organic light-emitting display device and a plasma display device, and a light-receiving display device such as a liquid crystal display device. The light-emitting display device self-emits a light. The light-receiving display device cannot self-emit a light and therefore requires a separate light source. A general liquid crystal display device includes two display panels which are provided with electric field generating electrodes, and a liquid crystal layer which has dielectric anisotropy and is interposed between the two liquid crystal panels. Voltage is applied to the electric field generating electrode, to thereby generate an electric field in the liquid crystal layer. The intensity of the electric field is adjusted by changing the voltage. Thus, a light valve is formed. By adjusting the transmissivity of a light passing through the liquid crystal layer, a desired image is obtained.

For the light passing through the liquid crystal layer, in general, an artificial light source which is separately provided is used. As a light source for a liquid crystal display device, often used is a light source which, from the rear surface side of a liquid crystal panel, uniformly irradiates the entire liquid crystal panel with a light, as exemplified by a fluorescent lamp such as a cold-cathode fluorescent lamp (CCFL). Normally, a light of a fluorescent lamp made incident on a side surface of a light guide plate is emitted from a front surface of the light guide plate as a substantially uniform light, and irradiates a liquid crystal panel from the rear surface side thereof.

Recently, from the standpoint of environmental problems and power saving, an image display device using a light emitting diode or a laser as a mercury-free, low power consumption light source is being developed. In particular, when used as a light source for an image display device, a laser is the most suitable light source for the image display device, due to not only the low power consumption but also the image quality such as a wide color reproduction range.

On the other hand, in a case where a laser light source is used to uniformly irradiate an entire liquid crystal panel with a light from the rear surface side of the liquid crystal panel, it is, unlike the above-mentioned fluorescent lamp, difficult to ensure a length of a light-emitting region. Thus, it is conceivable to adopt an edge light method in which an optical scanning device is used so that a side surface of a light guide plate provided on the rear surface side of a liquid crystal panel is linearly irradiated with a laser beam.

Generally, typical examples of an optical system for such linear irradiation include an optical scanning device used in a laser beam printer (LBP) or the like, and an illumination optical system used in a copying machine for reading an image or the like (see Patent Document 1).

Patent Document 1: Specification of Japanese Patent No. 2649744

SUMMARY OF THE INVENTION

However, an object of the prior art described above is to form an image on a focal plane by using a normal-brightness light source. Thus, it is difficult to simply adopt the above-described prior art as a scanning mechanism for linearly irradiating a side surface of a light guide plate with a laser light emitted from a high-brightness light source.

Therefore, an object of the present invention is to provide an optical scanning device capable of performing linear optical scanning in a stable and uniform manner by using a high-brightness light source.

The present invention is directed to an optical scanning device, and to a two-dimensional image display device using the optical scanning device for illumination of a spatial modulation element which two-dimensionally modulates light intensity. To accomplish the foregoing object, an optical scanning device according to the present invention includes: at least one laser light source for emitting a laser light; a deflection section for deflecting and scanning the laser light emitted from the at least one laser light source; and a light guide plate of which a side surface is irradiated with the laser light deflected and scanned by the deflection section. The at least one laser light source includes a multi-mode fiber light source, or a broad-stripe semiconductor laser light source which is arranged such that a vertical direction of a stripe structure is parallel to a scanning direction. An exit pupil in a thickness direction, which is perpendicular to the scanning direction, is formed at least in one area on the side surface of the light guide plate.

It is preferable that, when the deflection section is a rotating polygon mirror, a laser light emitted from an end portion, in the thickness direction, of the laser light source has a principal ray thereof intersecting a lens axis at least at one point on each mirror surface of the rotating polygon mirror. In addition, the scanning device may further include a mirror which has a power and is arranged between the deflection section and the light guide plate.

Moreover, the scanning device may further include a thickness-direction light condenser for condensing, in the thickness direction, the laser light deflected and scanned by the deflection section, so as to form the exit pupil at least in one area on the side surface of the light guide plate. The thickness-direction light condenser includes a plurality of Fresnel lenses or a plurality of Fresnel mirrors being arranged in the scanning direction. The plurality of Fresnel lenses or the plurality of Fresnel mirrors have different powers at least in the thickness direction.

Here, it is preferable that the plurality of Fresnel lenses or the plurality of Fresnel mirrors are set such that a focal length in the thickness direction becomes larger at a position closer to an end of a scanning range than a position closer to the center of the scanning range, and that the plurality of Fresnel lenses or the plurality of Fresnel mirrors include identical Fresnel lenses or identical Fresnel mirrors being arranged laterally-symmetrically with respect to the center of the scanning range. In addition, it is preferable that the plurality of Fresnel lenses or the plurality of Fresnel mirrors have the same thickness, or are formed of the same material. Further, it is preferable that the plurality of Fresnel lenses (mirrors) are linear Fresnel lenses (mirrors) which are at regular pitches in the thickness direction.

As another optical scanning device according the present invention, an optical scanning device is conceivable which includes: at least one laser light source for emitting a laser light; a deflection section for deflecting and scanning the laser light emitted from the at least one laser light source; and a light guide plate of which a side surface is irradiated with the laser light deflected and scanned by the deflection section.

The laser light emitted from the at least one laser light source is, on the deflection section, condensed in a scanning direction.

As still another solution, an optical scanning device is conceivable which includes: a laser light source for emitting a laser light, which includes a broad-stripe semiconductor laser; a deflection section for deflecting and scanning the laser light emitted from the laser light source; and a light guide plate of which a side surface is irradiated with the laser light deflected and scanned by the deflection section. The laser light source is arranged such that a vertical direction of a stripe structure is perpendicular to a scanning direction.

Further, an optical scanning device is conceivable which includes: a fiber light source for emitting at least one laser light; a polarization separation section for separating the at least one laser light emitted from the fiber light source, into an s-polarized light component and a p-polarized light component; a polarization rotating section for rotating, by 90 degrees, a laser light including one of the polarized light components separated by the polarization separation section; a deflection section for deflecting and scanning the laser light rotated by 90 degrees by the polarization rotating section and a laser light including the other of the polarized light components separated by the polarization separation section; and a light guide plate of which a side surface is irradiated with the laser lights deflected and scanned by the deflection section. The laser light rotated by 90 degrees by the polarization rotating section and the laser light including the other of the polarized light components separated by the polarization separation section are made incident on the deflection section in such a manner that the laser lights differ from each other, in at least one of an incident angle and an incident position.

In such a case, it is preferable that incident angles and incident positions of the respective laser lights are set such that the laser light rotated by 90 degrees by the polarization rotating section and the laser light including the other of the armed polarized light components separated by the polarization separation section scan the same scanning range on the light guide plate.

In addition, the optical scanning device may further include a fixture for fixing an optical fiber located inside the optical scanning device such that the laser light rotated by 90 degrees by the polarization rotating section and the laser light including the other of the polarized light components separated by the polarization separation section exhibit the same laser light intensity on the scanning surface of the light guide plate. Particularly when a light is, from the outside of the optical scanning device, guided in the fiber light source by an optical fiber, the optical scanning device may further include a reinforcer for reinforcing the optical fiber in order to prevent a portion of the optical fiber located outside the optical scanning device from being bent at not less than a predetermined curvature.

Further, an optical scanning device is also conceivable which includes: at least one laser light source for emitting a laser light; a deflection section including a single lens on which the laser light emitted from the at least one laser light source is made incident, the deflection section deflecting and scanning the incident laser light by vibrating the single lens; and a light guide plate of which a side surface is irradiated with the laser light deflected and scanned by the deflection section.

According to the present invention described above, an exit pupil, which requires an accuracy of merely a few millimeter order, is formed on a side surface of a light guide plate. Therefore, linear optical scanning can be performed in a stable and uniform manner by an inexpensive method using a high-brightness light source having a large size.

Figure 1:
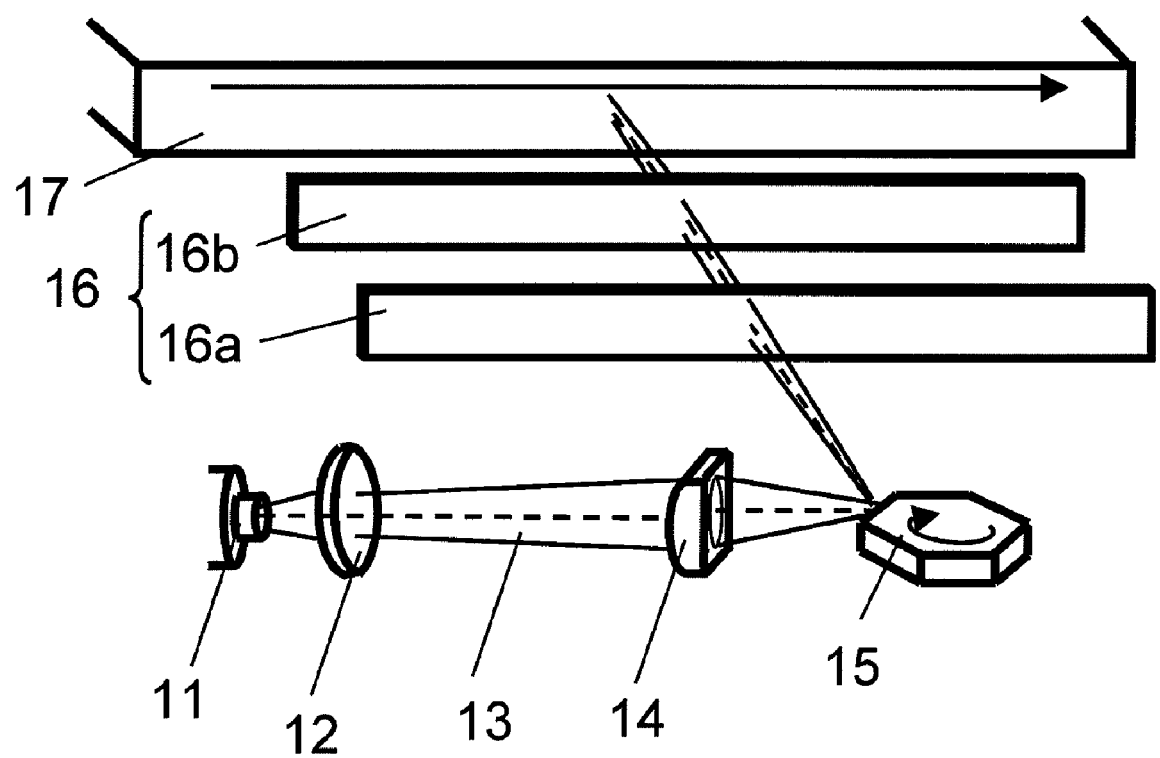
FIG. 1 is a diagram showing a configuration of an optical scanning device according to a first embodiment of the present invention.

DESCRIPTION OF THE REFERENCE CHARACTERS 11 laser light source (multi-mode fiber light source)
12 collimator lens
13, 13a-13g, 111, 113, 114, 116 laser light
14, 75 cylindrical lens
15, 118, 118a, 118b rotating polygon mirror
16, 16a, 16b, 76 scanning lens
17, 119 light guide plate
18, 19 principal ray
20 active layer
21 clad layer
22 light guide layer
26, 26a, 26b scanning mirror
46 linear Fresnel lens array
46a-46g, 109 linear Fresnel lens
107, 117, 117a, 117b, 123 redirecting mirror
108 liquid crystal panel
110 fiber light source
112 polarization beam splitter (PBS)
115 wave plate
120 fixture
121 light source unit
122 optical fiber cable
124 optical fiber cable with reinforcer

DETAILED DESCRIPTION OF THE INVENTION

Hereinafter, embodiments of the present invention will be described with reference to the drawings.

First Embodiment

FIG. 1 is a diagram showing a configuration of an optical scanning device according to a first embodiment of the present invention. The optical scanning device according to the first embodiment includes a laser light source 11, a collimator lens 12, a cylindrical lens 14, a rotating polygon mirror 15, a scanning lens 16, and a light guide plate 17. The scanning lens 16 has a front cylindrical lens 16a and a rear cylindrical lens 16b.

The laser light source 11 is a multi-mode fiber light source, in which a laser light 13 is guided through an optical fiber, not shown in the figure. The laser light 13 emitted from the multi-mode fiber light source 11 is, by the collimator lens 12, converted into a substantially parallel light in a thickness direction (a direction perpendicular to a scanning direction; the same shall apply hereinafter). The laser light 13, which has been converted into the substantially parallel light in the thickness direction, diverges at a divergence angle corresponding to the size of the light source, and is condensed by the cylindrical lens 14 in the thickness direction. The condensed laser light 13 is reflected by the rotating polygon mirror 15 which is a deflection section, and reaches the scanning lens 16 while diverging in the thickness direction. The laser light 13 having reached the scanning lens 16 is, while being collected again in the thickness direction by the front cylindrical lens 16a and the rear cylindrical lens 16b, incident on a side surface of the light guide plate 17.

The light guide plate 17 is, for example, used as a part of a backlight for uniformly illuminating a two-dimensional spatial modulation element such as a liquid crystal panel. In the light guide plate 17, diffusion beads, not shown, are uniformly scattered. The incident laser light 13 propagates in the light guide plate 17 while being diffused by the diffusion beads, and is emitted from a surface (a plane on the liquid crystal panel side) of the light guide plate 17. Here, placing a reflective material on the rear surface side of the light guide plate 17 enables efficient use of the laser light that is emitted from the rear surface of the light guide plate 17.

In the above-described configuration, the rotating polygon mirror 15 rotates at a high speed so that the laser light 13 scans the side surface of the light guide plate 17 at a high speed in the direction indicated by the arrow in FIG. 1. Thus, the laser light 13 to be emitted from the light guide plate 17 is diffused by the diffusion beads in the light guide plate 17, and the laser light 13 is emitted from the surface of the light guide plate 17 in a substantially uniform manner due to the high-speed scanning resulting from the high-speed rotation of the rotating polygon mirror 15. In this configuration, due to the high-speed scanning of the laser light 13 which is created by the rotating polygon mirror 15, the pattern of emission of the laser light from the light guide plate 17 varies along the time axis. Therefore, a speckle pattern, which is observed when the rotating polygon mirror 15 is stopped, can be reduced to such a level that no problem is presented in visual observation, during the rotation of the rotating polygon mirror 15.

Figure 2:
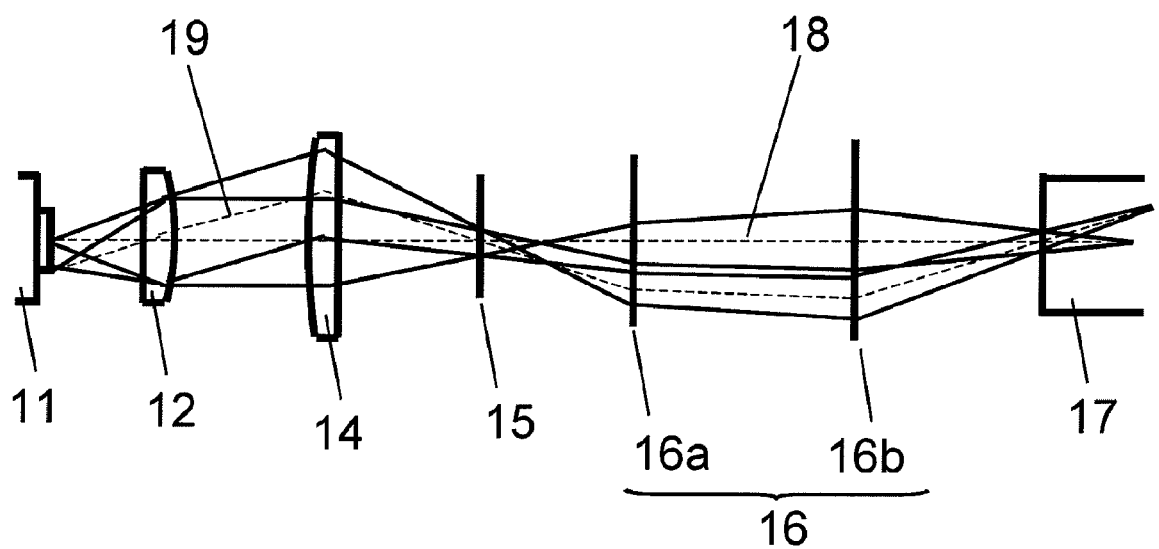
FIG. 2 is a diagram showing a cross section, in a thickness direction, of light propagation paths in the optical scanning device shown in FIG. 1.

With reference to FIG. 2, effects obtained by the optical scanning device according to the first embodiment will be described. FIG. 2 is a diagram showing a cross section, in the thickness direction, of light propagation paths in the optical scanning device shown in FIG. 1.

As shown in FIG. 2, a light emitting portion of the multi-mode fiber light source 11 has a predetermined size corresponding to a core diameter, and laser lights having various predetermined NAs are emitted from anywhere within the light emitting portion. Normally, a multimode fiber having a core diameter of approximately 10 micrometers to 1 millimeter is available. Since the multi-mode fiber light source 11 cannot be regarded as a point light source, the laser light having passed through the collimator lens 12, which is disposed at the focus position, does not propagate in a parallel manner.

Referring to FIG. 2, the propagation path of a laser light emitted from the center of the light emitting portion will be considered. A laser light emitted from the center of the light emitting portion horizontally propagates along a principal ray 18. The laser light having reached the collimator lens 12 is converted into a parallel beam, and condensed, by the cylindrical lens 14, to near the rotating polygon mirror 15. The laser light reflected by the rotating polygon mirror 15 reaches the scanning lens 16 while diverging in the thickness direction. Then, the laser light is condensed in the thickness direction by the scanning lens 16, and made incident on near the side surface of the light guide plate 17. A portion of the cross section shown in FIG. 2, which extends from the rotating polygon mirror 15 to the light guide plate 17, is a cross section in the thickness direction obtained by cutting along the principal ray 18 at a time when the rotating polygon mirror 15 reflects the laser light 13 in a deflecting manner at a predetermined angle.

The propagation path of a laser light emitted from a lower end of the light emitting portion will be considered. A laser light emitted from the lower end of the light emitting portion propagates along a principal ray 19. The laser light having reached the collimator lens 12 is converted into a parallel beam, and condensed, by the cylindrical lens 14, to near the rotating polygon mirror 15, in the same manner as described above. At this time, the principal ray 18 and the principal ray 19 intersect each other on an entrance pupil which is positioned near the collimator lens 12. The angle θ of the intersection is obtained by the equation: $\theta = \arctan(\Phi 11/(2 \times L12))$, where the focal length of the collimator lens 12 is defined as "L12", and the core diameter of the multi-mode fiber light source 11 is defined as "Φ11". The laser light reflected by the rotating polygon mirror 15 reaches the scanning lens 16 while diverging in the thickness direction. Then, the laser light is condensed in the thickness direction by the scanning lens 16, and, at a predetermined angle relative to the principal ray 18, made incident on the side surface of the light guide plate 17. The same applies to the propagation path of a laser light emitted from an upper end of the light emitting portion.

As described above, the optical scanning device according to the first embodiment of the present invention is characterized in that the components are arranged such that the laser light reflected in a deflecting manner by the rotating polygon mirror 15 forms an "exit pupil" in the thickness direction at least in one area on the side surface of the light guide plate 17. This arrangement provides the effect that, at least at this deflection angle, even though the core diameter of the multi-mode fiber light source 11 varies on a component-by-component basis, the beam diameter on the light guide plate 17 does not vary in principle if NAs are the same. In the same manner, even when a plurality of multi-mode fiber light sources 11 having different core diameters are used, lights can be converged on the light guide plate 17 so as to have similar beam diameters, if the NAs are the same. Thus, the range of choices for a fiber core diameter can be expanded.

For example, even when a plurality of multi-mode fiber light sources 11 having different core diameters corresponding to R, G, and B, respectively, are used; if the NAs of the fibers are the same and the optical path lengths from the multi-mode fiber light sources to the light guide plate 17 are the same, the beam diameters obtained on the side surface of the light guide plate 17 are the same when seen in a cross section including an exit pupil in the thickness direction being positioned on the side surface of the light guide plate 17. This makes designing very simple and easy. In general, the NA of an optical fiber depends on the refractive indexes of materials used for a core and a clad of the fiber. For example, a visible-range, low-loss fiber often has a core of silica and a clad of fluorine-doped silica. In such a case, generally, the NA is approximately 0.22, and thus does not depend on the core diameter. Therefore, the present embodiment is effective. In a conventional configuration in which an image plane is formed on the side surface of the light guide plate 17, when the variance or difference in the core diameter occurs, it is difficult to form the image plane, and a design load, costs, and a space are increased as compared with in the present invention.

Moreover, when a plurality of multi-mode fiber light sources 11 corresponding to R, G, and B are used as a backlight of a liquid crystal display, the ratio of the amounts of R, G, and B lights required for generating a white light is, generally, not 1:1:1. In addition, depending on a screen size, a high power of W class may be needed. Therefore, the optical scanning device of the present invention should be an essential technique for a liquid crystal backlight of a liquid crystal display using a plurality of multi-mode fiber light sources 11.

Here, if a principal ray of a laser light emitted from the lower end of the light emitting portion intersects an optical axis at least at one point on each of reflecting surfaces of the rotating polygon mirror 15; even when the reflecting surfaces of the rotating polygon mirror 15 are each inclined due to an optical face tangle error, at least in this deflection cross section, the laser light passes, as an exit pupil, through the same area which is located near the side surface of the light guide plate 17. Thus, since the scanning does not depend on the optical face tangle error of the rotating polygon mirror 15, scanning can be performed with increased accuracy by using an inexpensive rotating polygon mirror 15. Moreover, in such a condition, a beam waist position is near the rotating polygon mirror 15, and therefore a rotating polygon mirror of thin type can also be used, which enables further reduction of costs.

In the above-described first embodiment, the rotating polygon mirror 15 is used as a deflection section. However, another type of mirror, such as a galvanometer mirror or a MEMS mirror, may be used. In addition, the scanning lens 16 is also not limited to the one including two lenses. Moreover, instead of the multi-mode fiber light source 11, a rod integrator or a broad-stripe semiconductor laser may be used.

Figure 3:
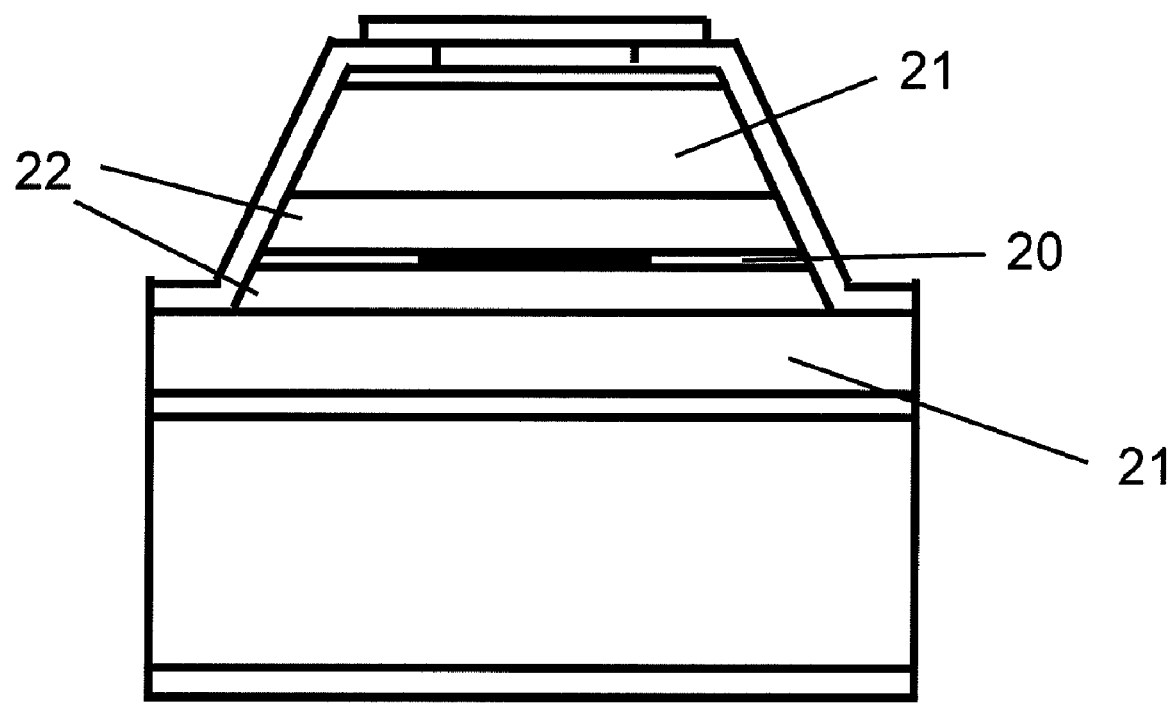
FIG. 3 is a side view showing a structural example of a broad-stripe semiconductor laser.

A broad-stripe semiconductor laser will be briefly described with reference to FIG. 3. FIG. 3 is a side view showing a structural example of a broad-stripe semiconductor laser.

In order to increase the output level of a semiconductor laser, if a simple method of increasing current to be injected into a single-mode semiconductor laser is taken, catastrophic optical damage (COD) and/or thermal saturation occur due to the rise in temperature of an emission end surface of the semiconductor laser, which is caused by the increase in injected carrier density and photon density. Thus, it is difficult to increase the amount of light up to or over a predetermined value (normally, approximately 0.3 W or higher). Therefore, in general, a stripe structure having a current injection region thereof expanded from several tens of micrometers to approximately submillimeters is provided, to thereby lower the internal light power density and reduce the internal loss, so that a high output level is obtained. Such a structure is referred to as a broad-stripe structure. A semiconductor laser having this structure is referred to as a broad-stripe semiconductor laser.

As shown in FIG. 3, in the broad-stripe semiconductor laser, light guide layers 22, which have a higher refractive index than that of clad layers 21, are provided on both sides of an active layer 20 which outputs a laser light, so that a current injection region is expanded in a horizontal direction. Thereby, the output level of the semiconductor laser is increased. However, when a stripe width is of approximately submillimeters in the horizontal direction, the laser can no longer be regarded as a point light source in terms of the horizontal direction. Therefore, when the broad-stripe semiconductor laser is used as a light source of the first embodiment, the same configuration as the configuration producing the light propagation path shown in FIG. 2 can be obtained by arranging the broad-stripe semiconductor laser such that the vertical direction of the broad-stripe semiconductor laser is parallel to the scanning direction (that is, such that the broad-stripe semiconductor does not serve as a point light source in a thickness direction).

Figure 4:
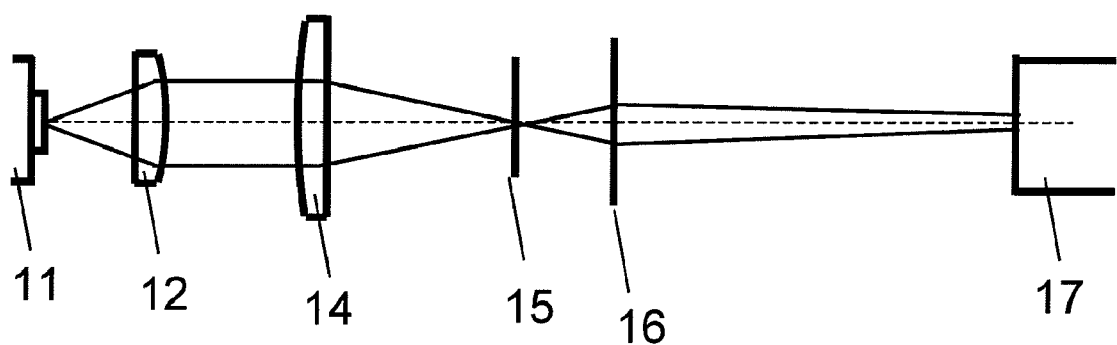
FIG. 4 is a diagram showing a cross section, in a thickness direction, of a light propagation path in the optical scanning device shown in FIG. 1 using the broad-stripe semiconductor laser.

When the broad-stripe semiconductor laser is used, the broad-stripe semiconductor laser may be arranged such that the vertical direction of the broad-stripe semiconductor laser is perpendicular to the scanning direction (that is, such that the broad-stripe semiconductor laser serves as a point light source in the thickness direction). FIG. 4 is a diagram showing a cross section, at a certain deflection angle, in a thickness direction of an optical system which adopts this arrangement. Since the broad-stripe semiconductor laser has a stripe width of approximately several micrometers in the thickness direction, the broad-stripe semiconductor laser can be regarded as a point light source. Therefore, the laser light, which has been converted by the collimator lens 12, propagates while remaining substantially parallel. Since the convergence of a beam from the rotating polygon mirror 15 to the light guide plate 17 can be reduced, similarly to in FIG. 2, an appropriate beam diameter can be obtained on the side surface of the light guide plate 17.

FIG. 4 illustrates that the beam is condensed on the rotating polygon mirror 15, but it is not necessary to condense the beam on the rotating polygon mirror 15. For the purpose of irradiating a side surface of a light guide plate used in a liquid crystal backlight, it suffices that a beam is incident on the side surface of the light guide plate. Therefore, the beam does not have to be condensed on the rotating polygon mirror 15. In addition, the cylindrical lens 14 may be omitted depending on the thickness of the light guide plate 17 and/or the thickness of the rotating polygon mirror 15. As for the scanning direction as well, since it suffices that a beam diameter falls within the light guide plate 17, the cylindrical lens 14 may or may not have a curvature (may be a spherical lens) in the scanning direction.

Second Embodiment

Figure 5:
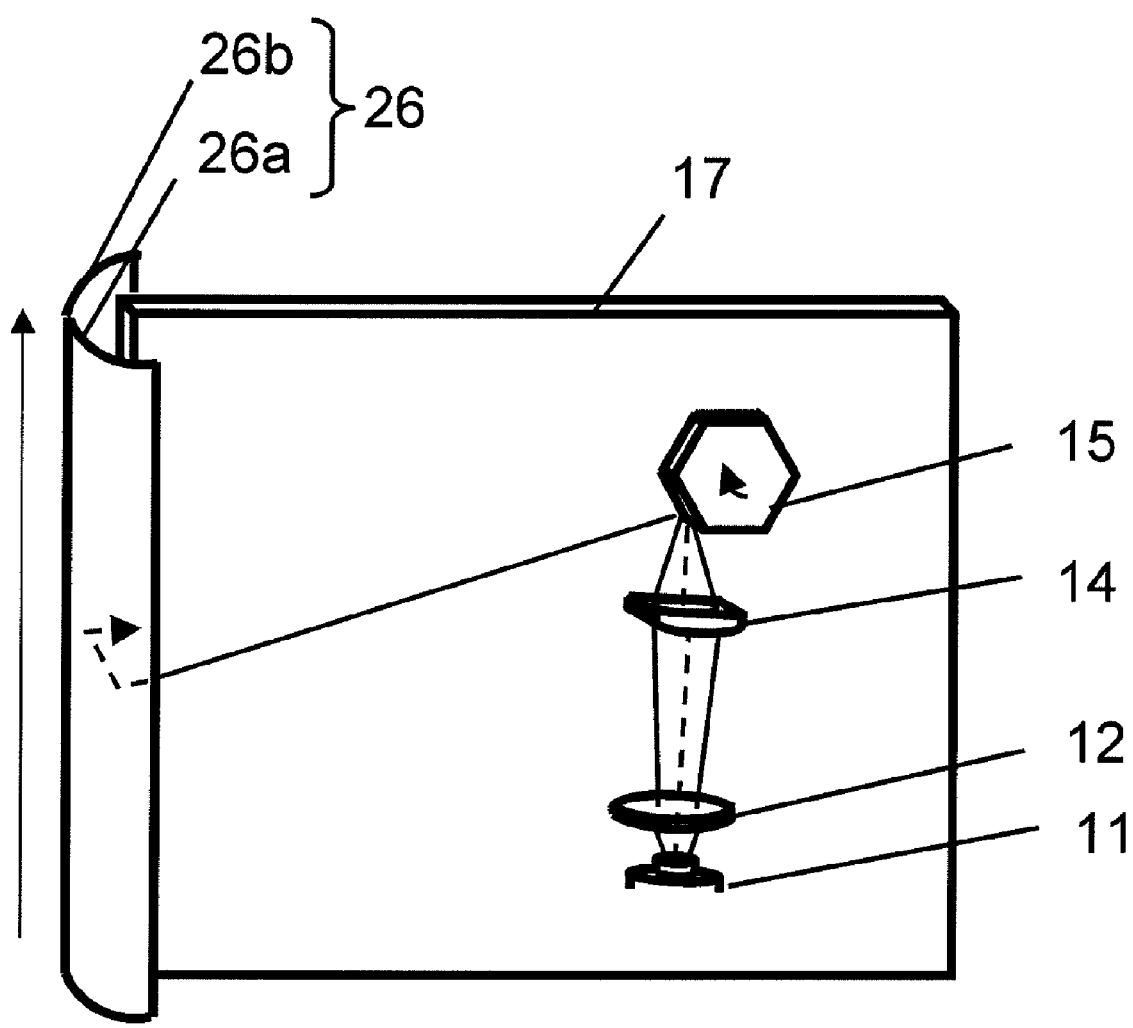
FIG. 5 is a diagram showing a configuration of an optical scanning device according to a second embodiment of the present invention.

FIG. 5 is a diagram showing a configuration of an optical scanning device according to a second embodiment of the present invention. The optical scanning device according to the second embodiment includes a laser light source 11, a collimator lens 12, a cylindrical lens 14, a rotating polygon mirror 15, a scanning mirror 26, and a light guide plate 17. The scanning mirror 26 has a front scanning mirror 26a and a rear scanning mirror 26b.

Figure 6:
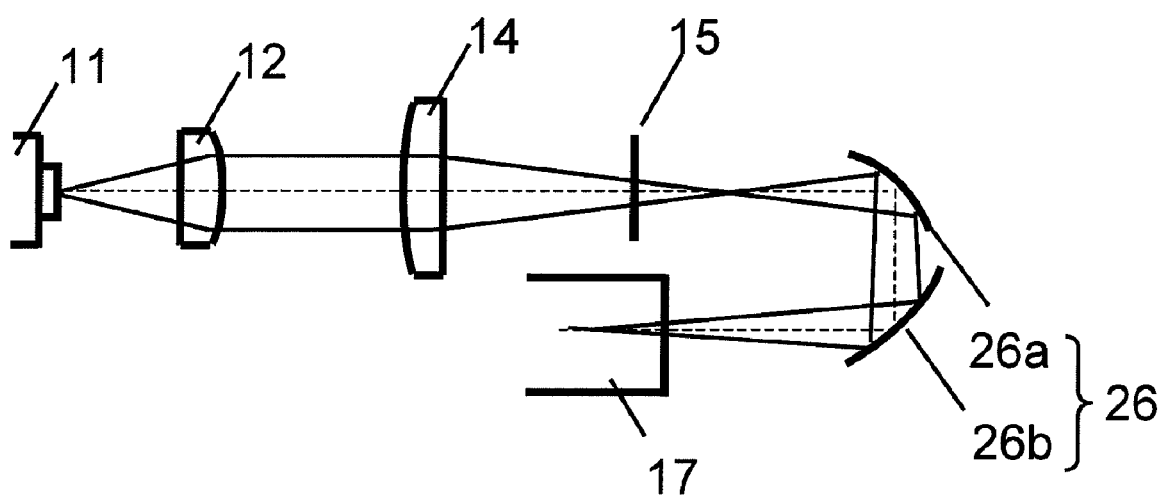
FIG. 6 is a diagram showing a cross section, in a thickness direction, of a light propagation path in the optical scanning device shown in FIG. 5.

FIG. 6 is a diagram showing a cross section, in a thickness direction, of a light propagation path in the optical scanning device shown in FIG. 5.

The optical scanning device according to the second embodiment differs from the above-described optical scanning device according to the first embodiment, in terms of the configuration of the scanning mirror 26. In addition, the laser light source 11 used in the second embodiment is not limited to a multi-mode fiber light source.

As described above, the present invention requires merely such an accuracy that an exit pupil is formed on the side surface of the light guide plate 17. Therefore, not a glass lens but a Fresnel lens which is inexpensive may be used as the scanning lens 16. Normally, a material of the Fresnel lens is a resin. However, while a resin lens is inexpensive, light absorption easily occurs particularly in the blue visible range (450 nm or less), and the linear expansion coefficient of the resin lens is an order of magnitude greater than that of an optical glass. The linear expansion coefficient of BK7 is approximately $7.1 \times 10^{-6}$ (/° C.), whereas the linear expansion coefficient of PMMA is approximately $7 \times 10^{-5}$ (/° C.). That is, when a resin lens such as a Fresnel lens is used, as compared with when a glass lens is used, heat generation, which is caused by absorption of a laser light, becomes greater as the amount of the laser light increases, so that the variation in light condensing characteristics, due to thermal expansion accordingly caused, is significant. However, since the width of, in particular, the scanning lens 16 has to cover an entire scanning region, the lens has a larger width particularly in an optical system for a large-screen size. Therefore, in view of the processing suitability and costs, it is desirable to avoid using the glass lens.

Thus, the optical scanning device according to the second embodiment is configured by using the scanning mirror 26 instead of the scanning lens 16, to thereby relieve the influence of heat generation caused by absorption of a laser light. The scanning mirror 26 can be manufactured at a low cost, because a resin base can be coated with aluminum or a dielectric.

Needless to say, the laser light may be reflected at an angle other than 180 degrees. In addition, the collimator lens 12 and the cylindrical lens 14 may also be configured so as to use curved mirrors for reflection.

Third Embodiment

Figure 7:
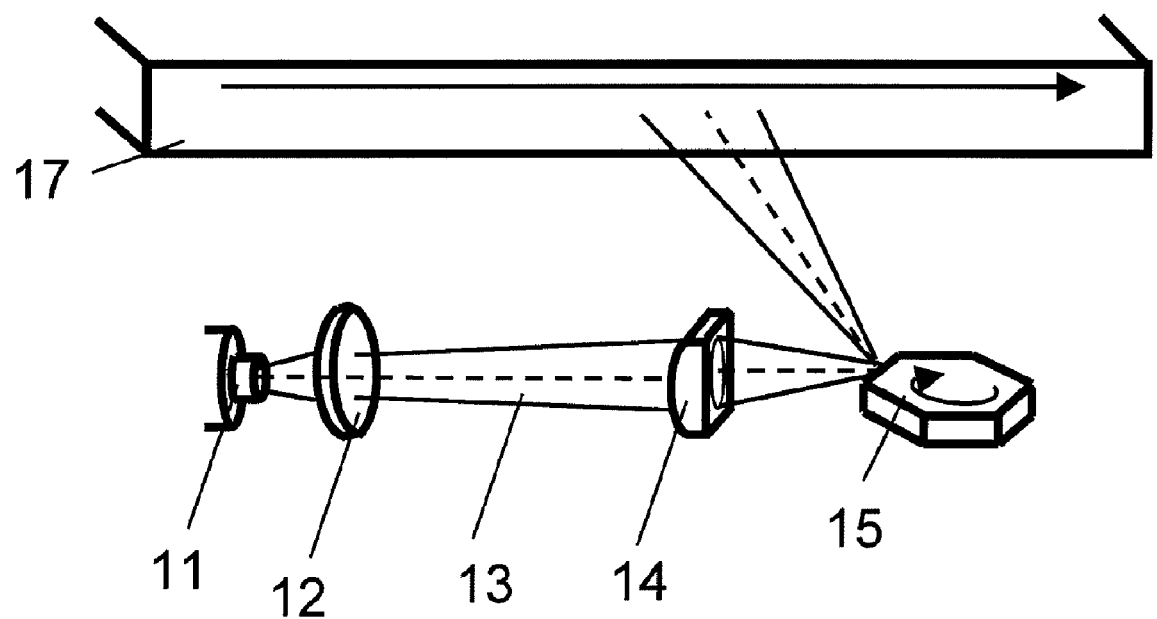
FIG. 7 is a diagram showing a configuration of an optical scanning device according to a third embodiment of the present invention.

FIG. 7 is a diagram showing a configuration of an optical scanning device according to a third embodiment of the present invention. The optical scanning device according to the third embodiment includes a laser light source 11, a collimator lens 12, a cylindrical lens 14, a rotating polygon mirror 15, and a light guide plate 17.

Figure 8:
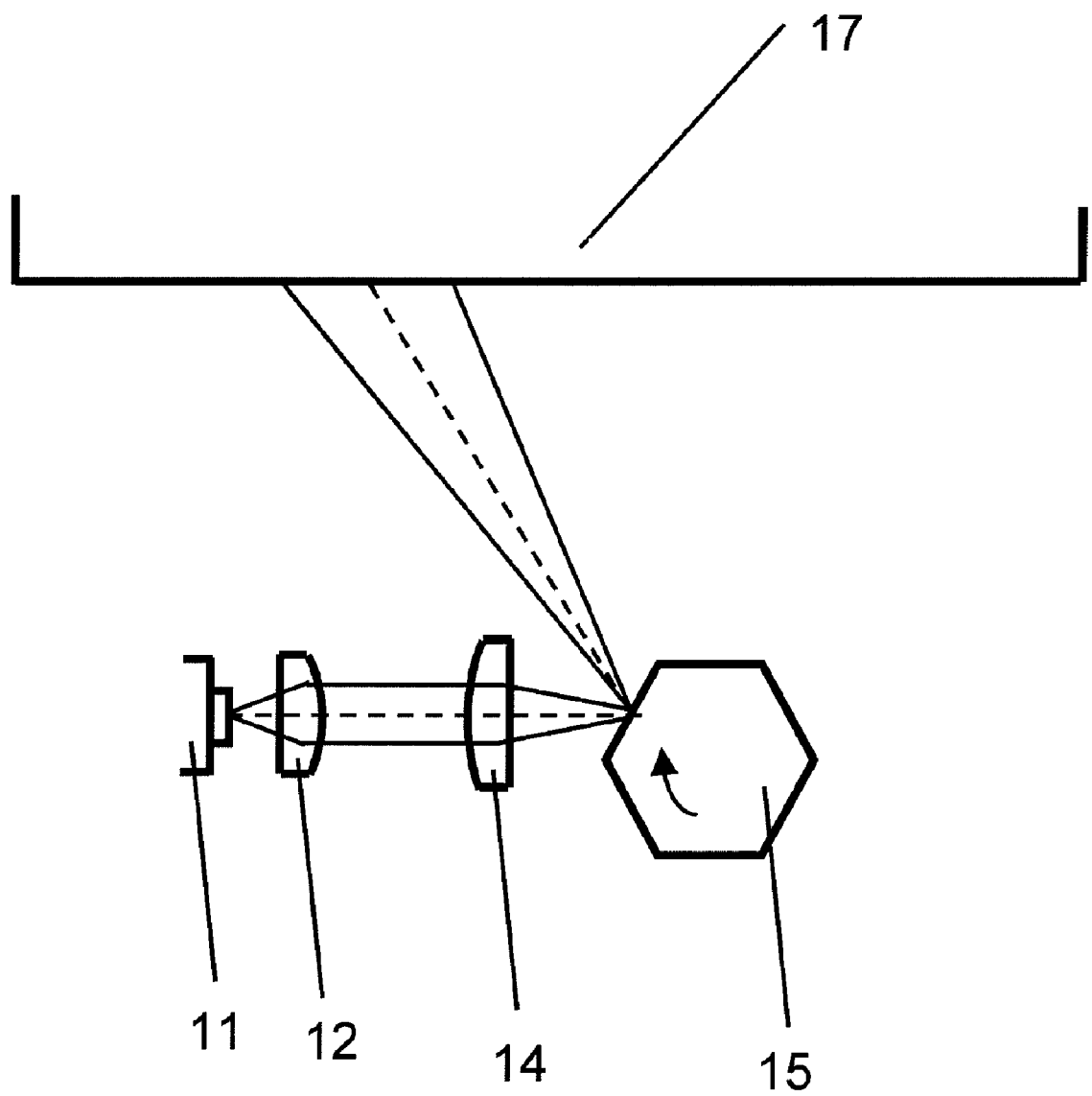
FIG. 8 is a diagram showing a cross section, in a scanning direction, of a light propagation path in the optical scanning device shown in FIG. 7.

FIG. 8 is a diagram showing a cross section, in a scanning direction, of a light propagation path in the optical scanning device shown in FIG. 7.

The configuration of the optical scanning device according to the third embodiment differs from the configurations of the optical scanning devices according to the first and second embodiments described above, in that the scanning lens 16 or the scanning mirror 26 is not provided. The collimator lens 12 and the cylindrical lens 14 are arranged so as to have curvatures in the scanning direction. In addition, the laser light source 11 used in the third embodiment is not limited to a multi-mode fiber light source.

A laser light 13 emitted from the laser light source 11 is, by the collimator lens 12, converted into a substantially parallel light in the scanning direction. The laser light 13, which has been converted into the substantially parallel light in the scanning direction, is condensed by the cylindrical lens 14 in the scanning direction. The condensed laser light 13 is reflected by the rotating polygon mirror 15 and, while diverging in the scanning direction, incident on the light guide plate 17 from a side surface thereof. As described above, the beam diameter of a laser light does not matter, as long as the laser light is incident on the side surface of the light guide plate. Therefore, as shown in FIG. 8, the laser light is, after being reflected by the rotating polygon mirror 15, not condensed at all in the scanning direction. In this manner, the following effects can be obtained.

The laser light reflected by the rotating polygon mirror 15 has a large view angle (a large beam diameter). Therefore, by emitting the laser light to the light guide plate 17 without collecting the beam in the scanning direction, the laser light can be inputted over a range from one end to the other end of the light guide plate 17 with a scanning distance being shortened due to the largeness of the view angle of the laser light. This enables the device to be downsized. In addition, a large view angle of the laser light enables brightness to be uniformized. This is also effective in reducing speckle on an image. This is because, assuming a certain point on the light guide plate 17, a light which contributes to illumination of the certain point is scanned at a larger view angle as the diameter, in the scanning direction, of the beam irradiating the side surface of the light guide plate 17 increases. Thus, by condensing the laser light on the rotating polygon mirror 15, both of downsizing and improved image quality can be easily achieved.

The collimator lens 12 and the cylindrical lens 14 may be arranged so as to have curvatures in the scanning direction. Here, spherical lenses may be used as the collimator lens 12 and the cylindrical lens 14 so as to have curvatures also in the thickness direction, which is the same configuration as those in the first and second embodiments. Needless to say, the scanning mirror 26 may be provided to turn back the laser light.

Fourth Embodiment

Figure 9:
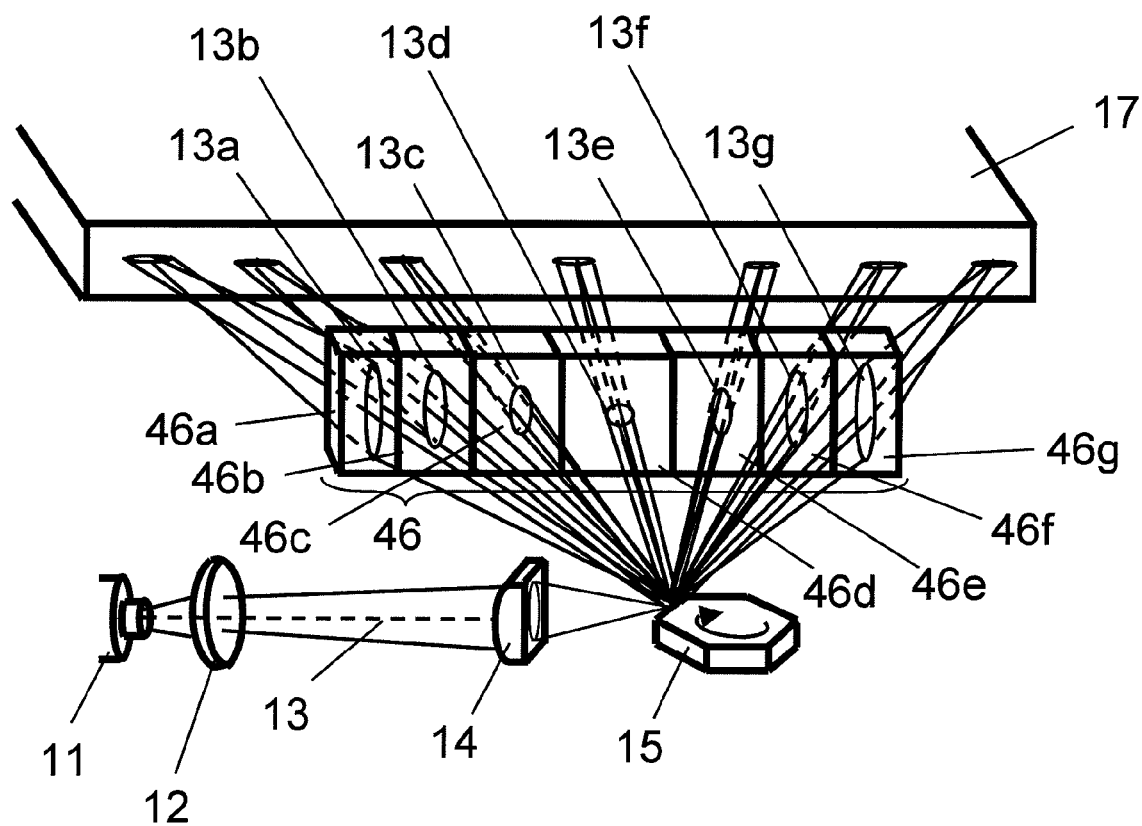
FIG. 9 is a diagram showing a configuration of an optical scanning device according to a fourth embodiment of the present invention.

FIG. 9 is a diagram showing a configuration of an optical scanning device according to a fourth embodiment of the present invention. The optical scanning device according to the fourth embodiment includes a laser light source 11, a collimator lens 12, a cylindrical lens 14, a rotating polygon mirror 15, a linear Fresnel lens array 46, and a light guide plate 17. The cylindrical lens 14 and the linear Fresnel lens array 46 have powers in the thickness direction.

The optical scanning device according to the fourth embodiment differs from the optical scanning device according to the first embodiment described above, in that the scanning lens 16 having two lenses is replaced with one linear Fresnel lens array 46.

A laser light 13 reflected by the rotating polygon mirror 15 is deflected and scanned toward the linear Fresnel lens array 46. The deflected and scanned laser light 13 passes through the linear Fresnel lens array 46, and then reaches a side surface of the light guide plate 17. Here, as shown in FIG. 9, the degree of light divergence in the deflecting direction becomes greater in a beam closer to an end of a scanning range than in a beam closer to the center of the scanning range, among beams 13a to 13g on the linear Fresnel lens array 46. This is because, since the laser light 13 is linearly condensed in the thickness direction on the rotating polygon mirror 15, the beam reflected by the rotating polygon mirror 15 is scattered at a predetermined scattering angle, and in addition because a distance from the rotating polygon mirror 15 to the linear Fresnel lens array 46 becomes larger at a position closer to the end of the scanning range than at a position closer to the center of the scanning range.

Figure 10:
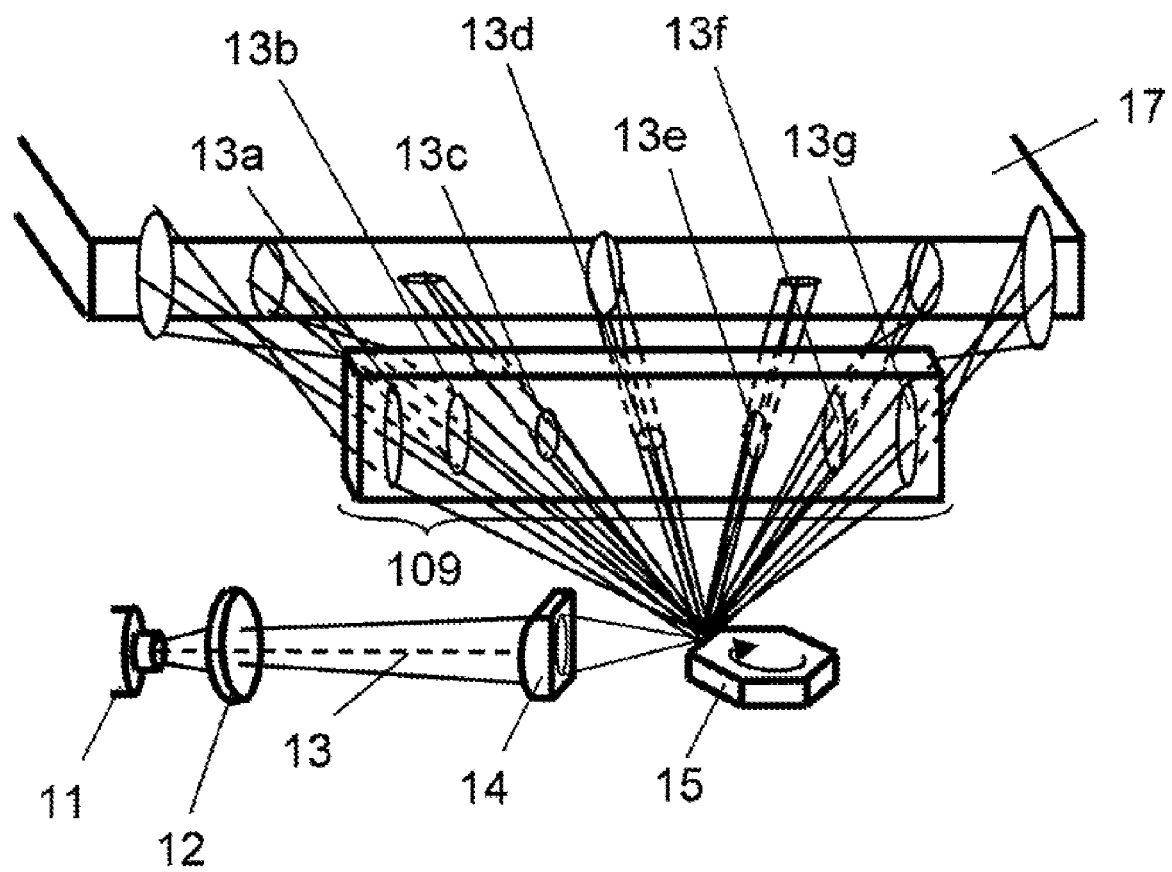
FIG. 10 is a diagram showing a configuration of a conventional optical scanning device.
Figure 14A:
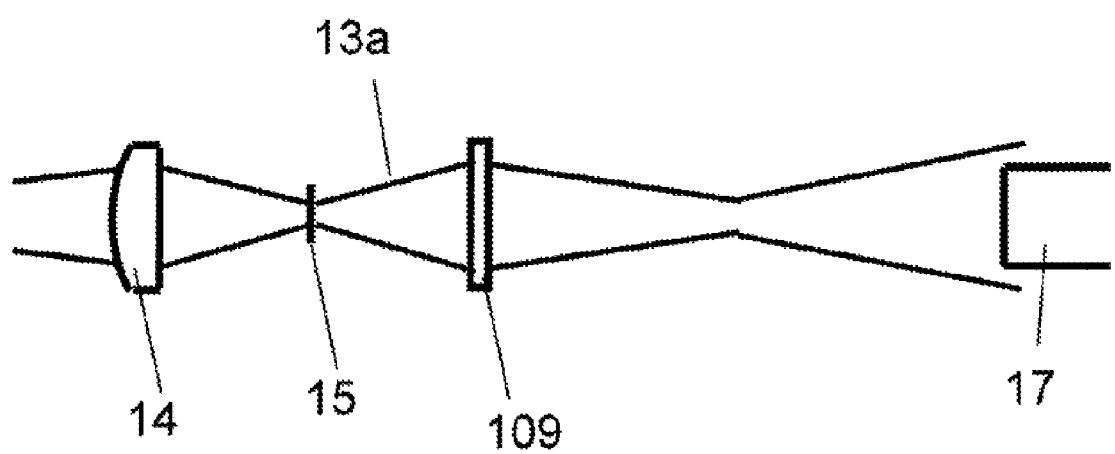
FIG. 14A is a diagram illustrating a beam which propagates through a linear Fresnel lens 109 shown in FIG. 10.

Normally, when, in this condition, a single linear Fresnel lens having a constant power in the scanning direction is used, an experienced lens power becomes smaller as the beam diameter on the lens decreases, and therefore a power of the linear Fresnel lens 46d experienced by the beam 13d which is at the center of the scanning range is relatively small while powers of the linear Fresnel lenses 46a and 46g experienced by the beams 13a and 13g which are at the ends of the scanning range are large. Therefore, if the position or the curvature of a linear Fresnel lens 109 is set such that the beams 13c and 13e which are at intermediate positions in the scanning range are brought into focus on the light guide plate 17 as shown in FIG. 10, the beam 13d which is at the center of the scanning range has an expanded beam diameter because the light cannot be sufficiently condensed on the light guide plate 17. On the other hand, the beams 13b and 13f at intermediate positions in the scanning range, and the beams 13a and 13g at the ends of the scanning range also have expanded beam diameters on the light guide plate 17, because the beams 13b, 13f, 13a and 13g are brought into focus on positions before the light guide plate 17 (see FIG. 14A).

Figure 11A:
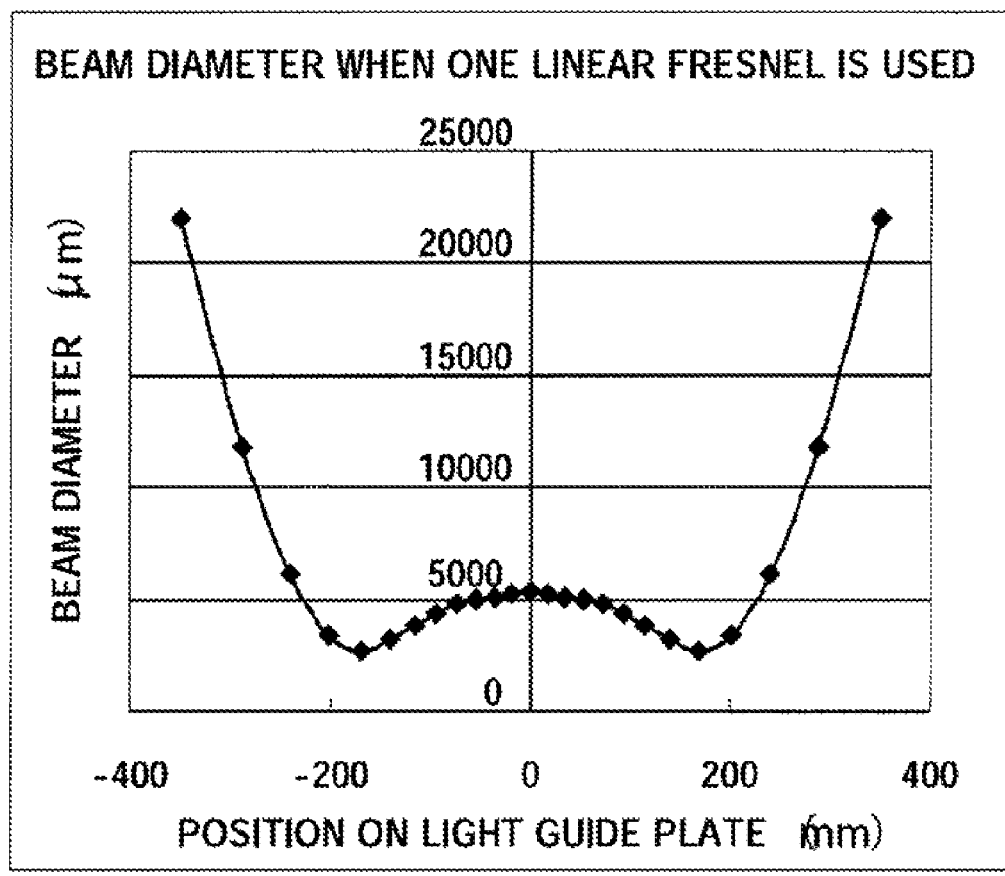
FIG. 11A is a diagram illustrating a distribution of beam diameters in the optical scanning device shown in FIG. 10.

For example, in a case where: the distance from the rotating polygon mirror 15 to the linear Fresnel lens 109 is 100 mm; the distance from the linear Fresnel lens 109 to an end surface of the light guide plate 17 is 102 mm; the focal length of the linear Fresnel lens 109 is 70 mm; and the length (the scanning length) of the end surface of the light guide plate 17 is 700 mm, a beam incident on the rotating polygon mirror 15 at a half angle at half maximum, in the thickness direction, of 5.7 degrees has a beam diameter as shown in FIG. 11, on a scanning surface of the end surface of the light guide plate 17. That is, only beams within about 180 mm from the center of the scanning range are collected in an appropriate manner so as to have beam diameters (full widths at half maximum) of approximately 3 mm.

Generally, the light guide plate 17 is approximately several millimeters. In the optical scanning device shown in FIG. 10, the beam is cut off by the light guide plate 17, at the ends of the scanning range, which is a problem. Further, as described in the second embodiment, a resin which has a large linear expansion coefficient is generally used for the linear Fresnel lens 109. Thus, particularly when a high power laser of W class is used, significant expansion and contraction are exhibited due to heat generation caused by absorption of a laser light and variation in the ambient temperature. Consequently, the power of the linear Fresnel lens varies, so that a beam diameter obtained on the side surface of the light guide plate is further shifted.

Figure 11B:
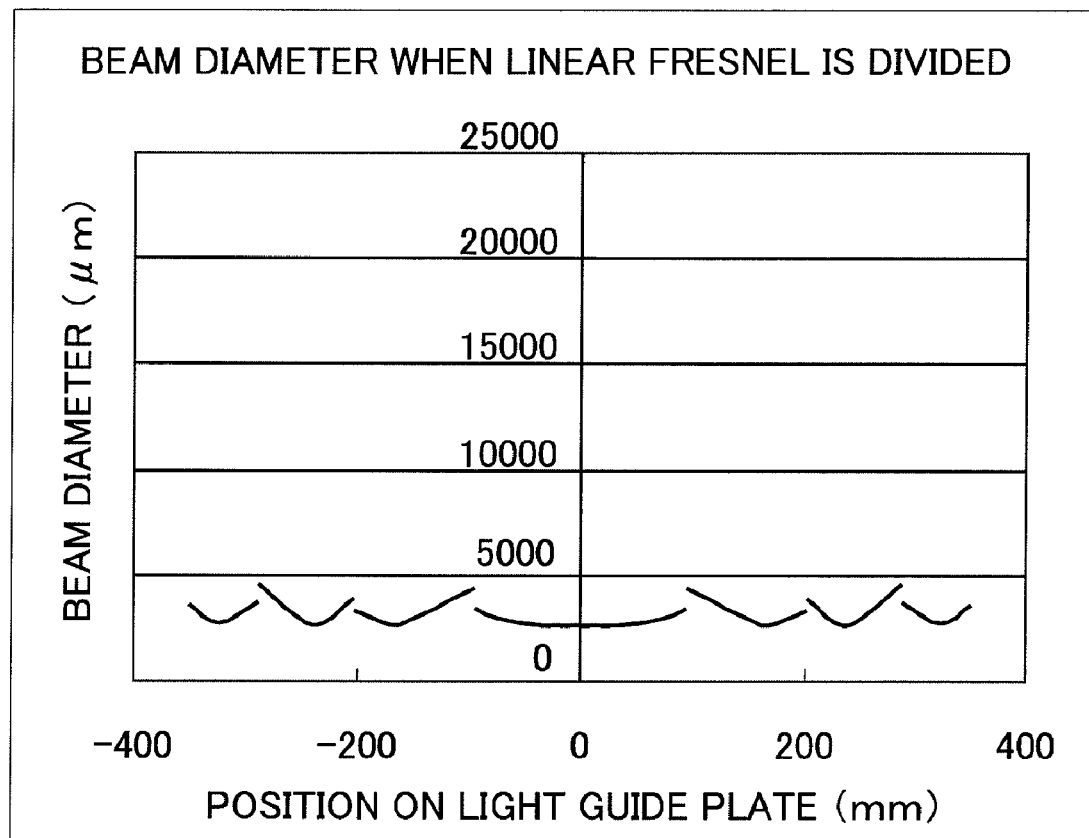
FIG. 11B is a diagram illustrating a distribution of beam diameters in the optical scanning device shown in FIG. 9.
Figure 14B:
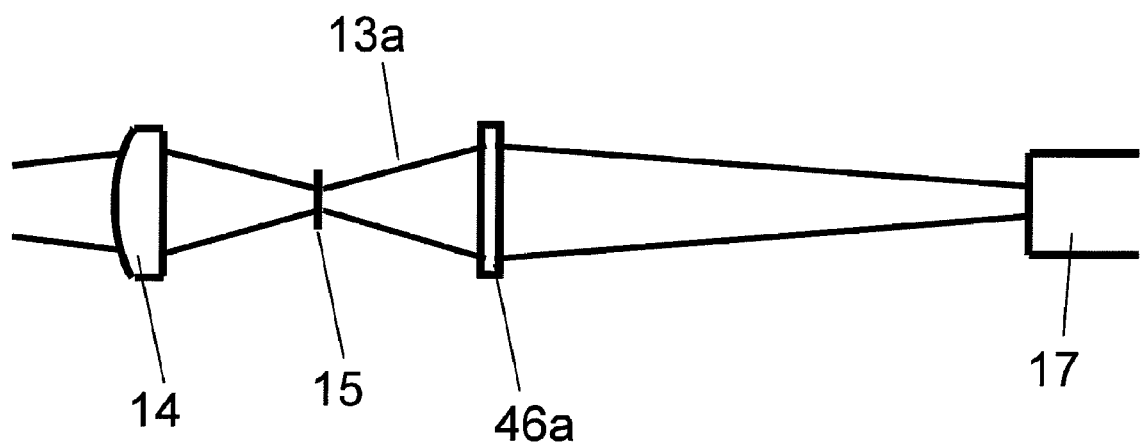
FIG. 14B is a diagram illustrating a beam which propagates through a linear Fresnel lens 46 shown in FIG. 9.

Thus, in the fourth embodiment, the linear Fresnel lens array 46 includes a plurality of separate linear Fresnel lenses 46a to 46g having different powers, as shown in FIG. 9. The powers of the linear Fresnel lenses 46a to 46g are selected such that a beam passing through the center of each of the linear Fresnel lenses 46a to 46g has the smallest beam diameter, among beams passing through each of the linear Fresnel lenses 46a to 46g (see FIG. 14B). As a result, over an entire scanning range, lights are condensed so as to have beam diameters of 5 mm or less, as shown in FIG. 11B. Thus, the lights are condensed to have appropriate beam diameters in the entire scanning range. Moreover, even if a beam width in the thickness direction varies due to influence of the thermal expansion and contraction of the linear Fresnel lens, the beam diameter can be limited within the thickness of the light guide plate 17, by dividing the linear Fresnel lens into an increased number of divisions while taking the amount of variation into consideration as a margin. In an example shown in FIG. 12, the focal lengths of the linear Fresnel lenses 46a, 46b, 46c, 46d, 46e, 46f, and 46g are 100, 84, 70, 54, 70, 84, and 100 mm, respectively.

Figure 13:
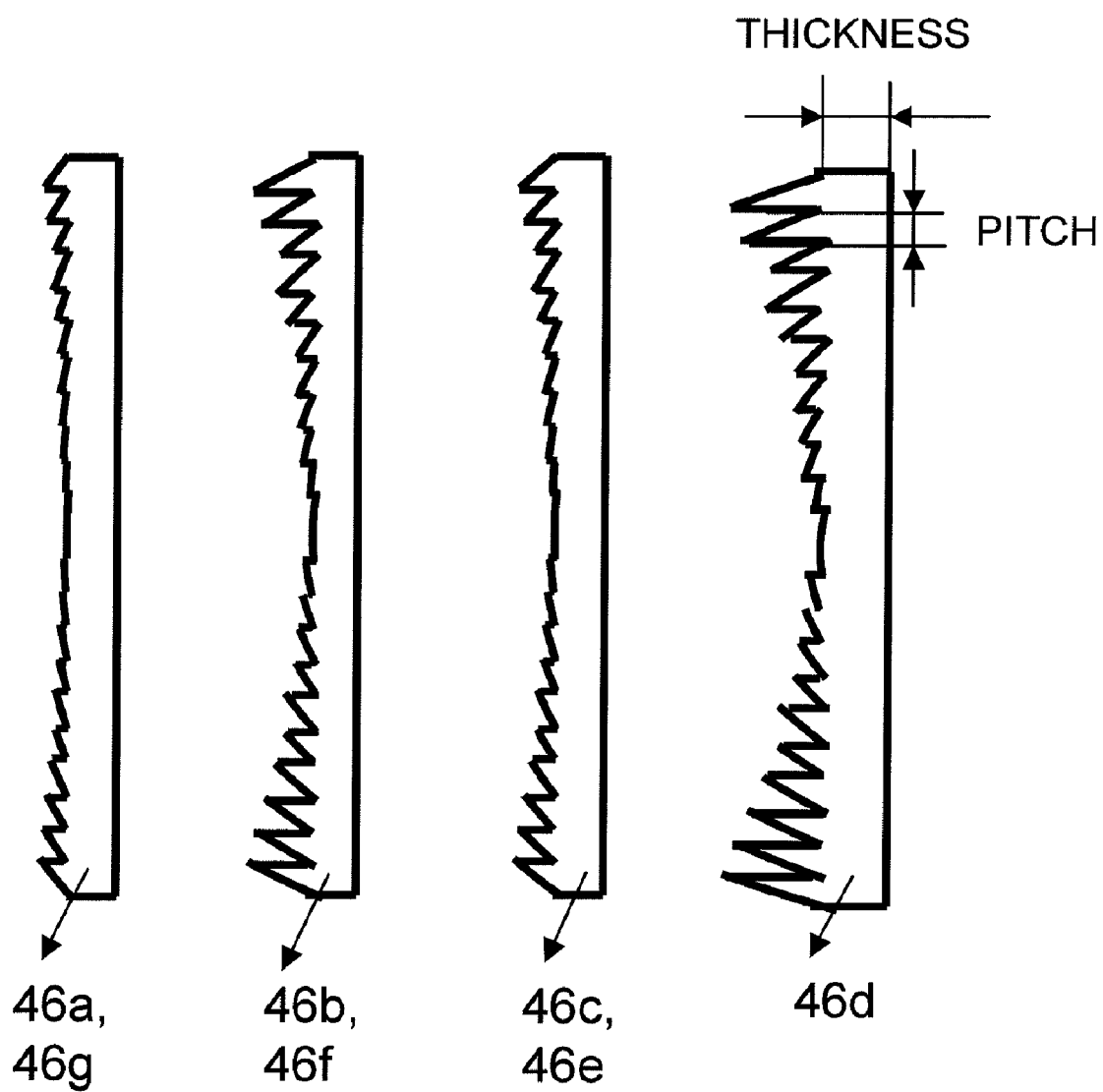
FIG. 13 is a diagram showing cross sections of linear Fresnel lenses 46a to 46g shown in FIG. 9 having exemplary shapes.

On the other hand, in a case where a plurality of linear Fresnel lenses 46a to 46g are joined to each other as shown in FIG. 9, a beam traversing an interface between the lenses may scatter at the joint portion. When, as in the present invention, a beam, which is incident on the light guide plate 17, scattered, and emitted from the surface of the light guide plate 17, irradiates a two-dimensional spatial modulation element such as a liquid crystal panel, an interface in the linear Fresnel lens array 46 is almost not visually observed. However, in a case where an increased number of lenses are joined, or the like, the light utilization efficiency may drop. Accordingly, in order to prevent the drop in light utilization efficiency as much as possible, it is desirable that a plurality of linear Fresnel lenses 46a to 46g joined to each other have substantially the same shape. That is, by using linear Fresnel lenses having the same thickness and formed of the same material as shown in FIG. 13, the drop in light utilization efficiency, due to scattering at the joint portions between the linear Fresnel lenses 46a to 46g, can be suppressed to the minimum.

Here, the linear Fresnel lens array 46 may have a curvature not only in the thickness direction but also in the scanning direction. In addition, in the linear Fresnel lens array 46, the drop in light utilization efficiency, due to the scattering at the joint portions between the linear Fresnel lenses, can be suppressed to the minimum, when the pitches of the Fresnel lenses 46a to 46g, as well as the thickness and the material thereof, are made the same, as shown in FIG. 13.

Further, instead of arranging the linear Fresnel lens array 46, a light condensing function may be provided to the scanning mirror 26. That is, the scan mirror 26 may be divided in the scanning direction so as to have different powers in the thickness direction, for use as a linear Fresnel mirror array. This also realizes an optical scanning system which has increased resistance against expansion and contraction caused by temperature variation.

As described above, the optical scanning devices according to the first to fourth embodiments of the present invention have the configuration in which, not an image plane which requires an accuracy of several tens of micrometer order, but an exit pupil which requires an accuracy of merely several millimeter order is formed on the side surface of the light guide plate. Therefore, an optical scanning device can be easily realized by using a high-brightness light source having a large size.

Figure 12:
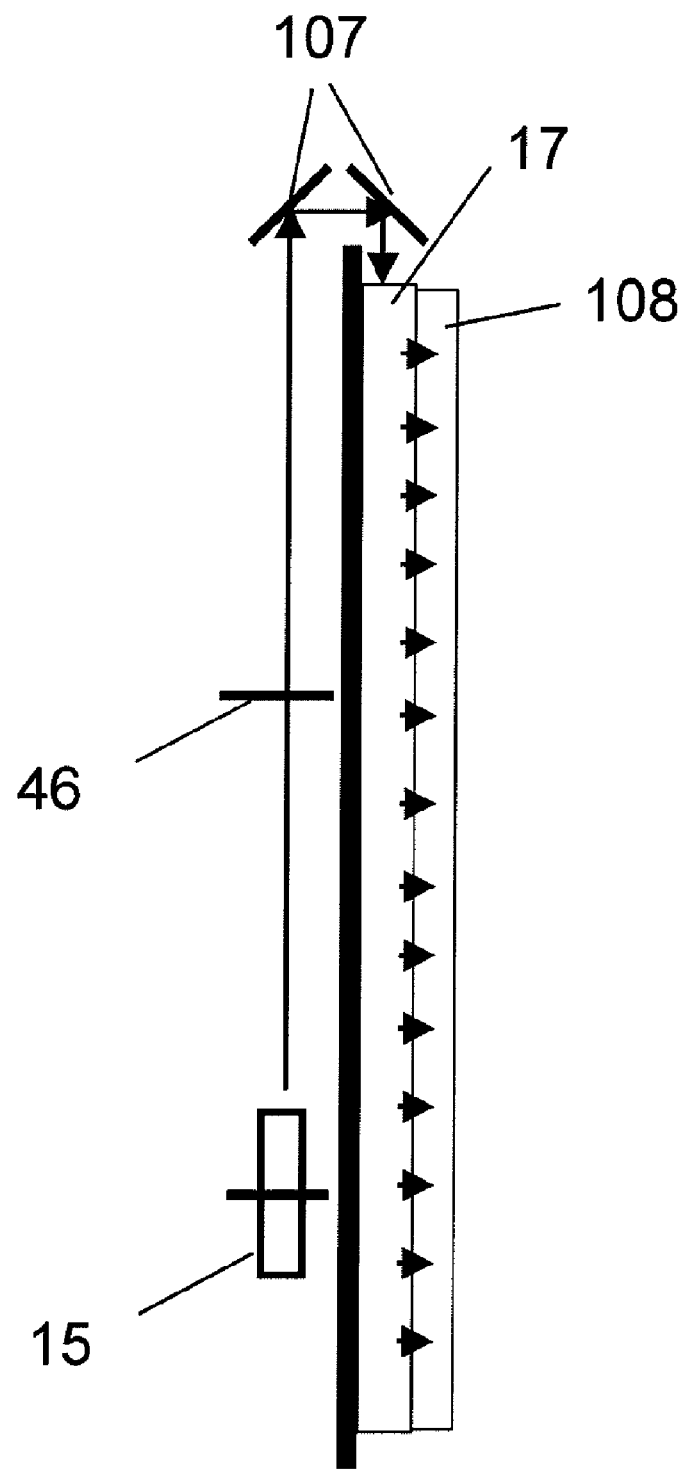
FIG. 12 is a diagram showing an exemplary configuration of the optical scanning device shown in FIG. 9 when used as a backlight of a liquid crystal panel.

FIG. 12 is a diagram showing an exemplary configuration of the optical scanning device according to the fourth embodiment of the present invention when used as a backlight of a liquid crystal panel. A laser light passing through the linear Fresnel lens array 46 is turned back by a redirecting mirror 107, and then incident on the light guide plate 17. The laser light having reached the light guide plate 17 is diffused while propagating in the light guide plate 17, and emitted from the surface of the light guide plate 17, to irradiate a liquid crystal panel 108 from the rear side thereof.

Fifth Embodiment

In general, since a liquid crystal panel modulates and transmits therethrough a beam having a predetermined polarization direction, the efficiency may be improved when a beam guided in the liquid crystal panel has a single polarization. On the other hand, in a case of optical scanning by using a high-power light source, it is convenient that a large number of semiconductor lasers are bundled by an optical fiber and used as a single light source. However, even if a beam is outputted from a semiconductor laser providing a single polarization, the light becomes a randomly polarized light after passing through an optical fiber, because of mixing of polarization directions.

Figure 15:
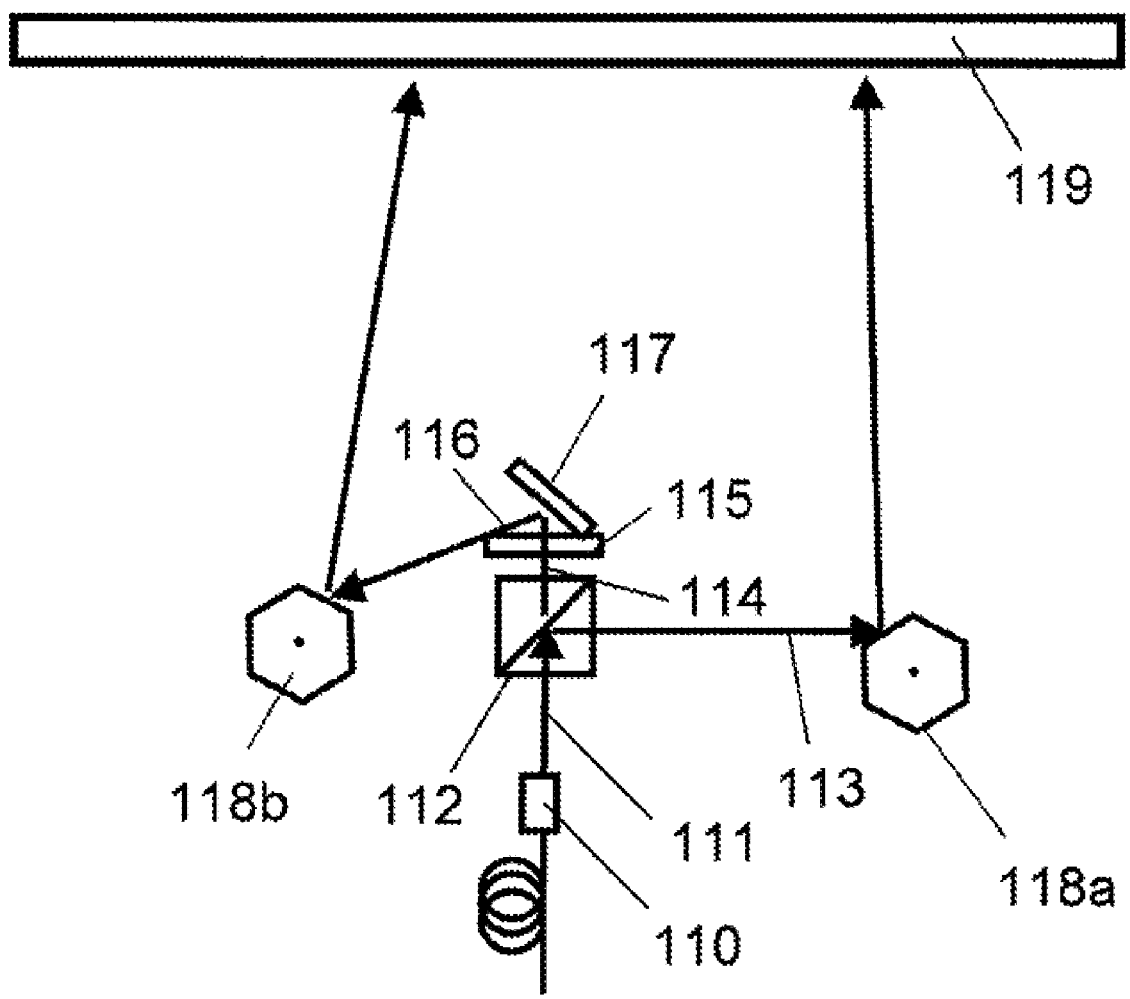
FIG. 15 is a diagram showing a configuration of a conventional optical scanning device.

In order to align the polarization directions of a randomly polarized light, it is conceivable that a randomly polarized laser light is separated into an s-polarized light and a p-polarized light, and the light guide plate is divided into left and right parts so as to be separately scanned by an optical system for the s-polarized light and an optical system for the p-polarized light, respectively (FIG. 15).

However, in this configuration, different amounts of laser lights reach a left part and a right part of a light guide plate 119, respectively, due to the difference in transmissivity between an s-polarized light 113 and a p-polarized light 114 through a polarization beam splitter (PBS) 112, a transmission loss in a wave plate 115, a reflection loss in a redirecting mirror 117, the difference in reflectance between rotating polygon mirrors 118a and 118b, and the like. This undesirably appears as nonuniform brightness on an image, when visually observed.

Thus, in the fifth embodiment, an optical scanning device capable of solving the above-described problem by using only one optical system will be described.

Figure 16:
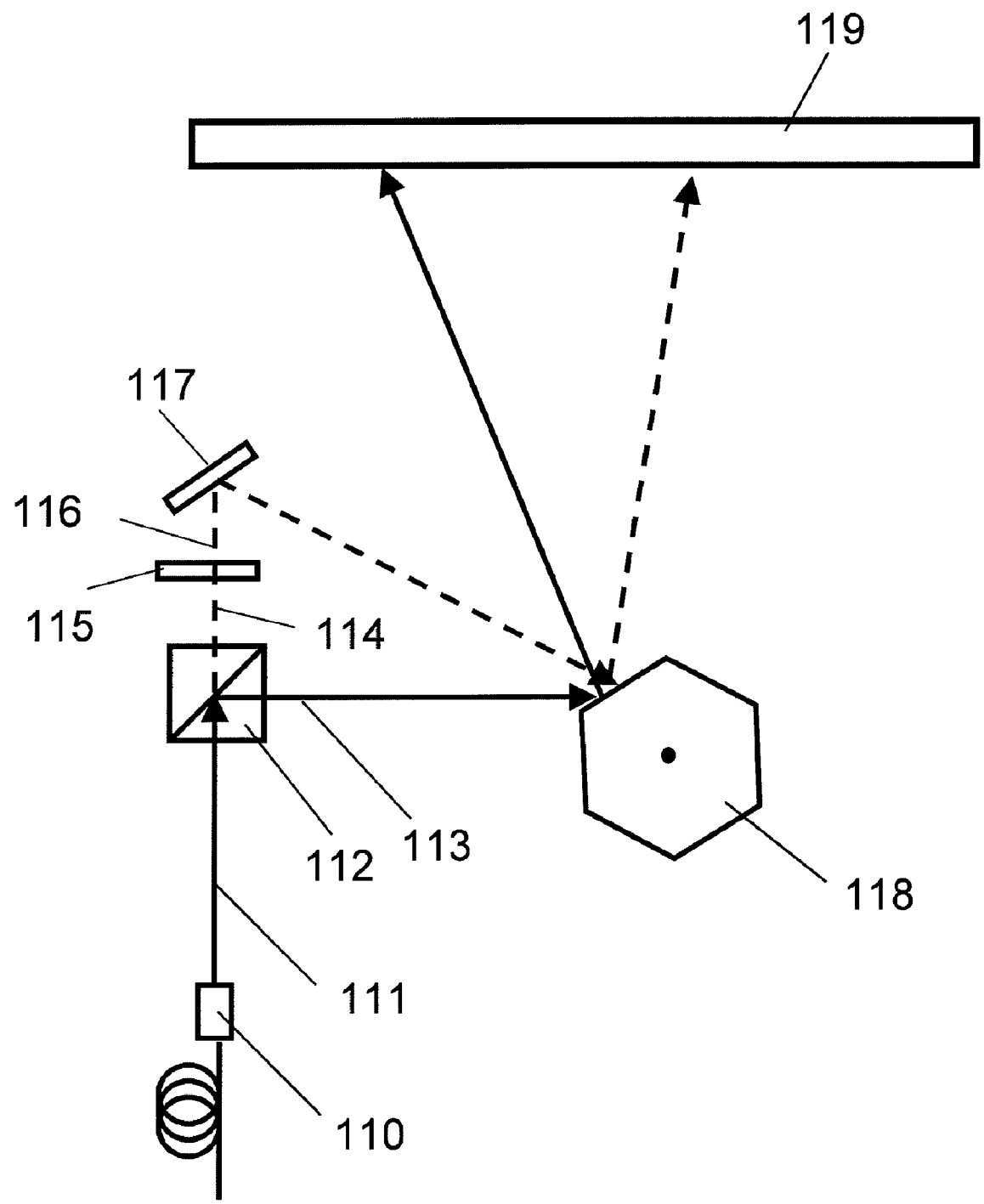
FIG. 16 is a diagram showing a configuration of an optical scanning device according to a fifth embodiment of the present invention.

FIG. 16 is a diagram showing a configuration of an optical scanning device according to the fifth embodiment of the present invention. The optical scanning device according to the fifth embodiment includes a fiber light source 110, a PBS 112, a wave plate 115, a redirecting mirror 117, a rotating polygon mirror 118, and a light guide plate 119.

The fiber light source 110 outputs a randomly-polarized laser light 111 of which the polarization directions are not aligned. The laser light 111 is, through the PBS 112, separated into an s-polarized light 113 and a p-polarized light 114. The s-polarized light 113 is emitted to the rotating polygon mirror 118, and reflected by the rotating polygon mirror 118, to be inputted to the light guide plate 119. The p-polarized light 114 has the polarization direction thereof being rotated by 90 degrees through the wave plate 115 and thus becomes an s-polarized light. The s-polarized light is then reflected by the redirecting mirror 117, and reaches the rotating polygon mirror 118. This s-polarized light is reflected by the rotating polygon mirror 118, and made incident on the light guide plate 119. Needless to say, the paths of the s-polarized light 113 and the p-polarized light 114 may be interchanged.

As described above, in the optical scanning device according to the fifth embodiment of the present invention, beams having the same polarization direction can be obtained in the light guide plate 119, by aligning polarization directions of the randomly-polarized laser light 111. In particular, the s-polarized light 113 and the p-polarized light 114 which have been separated from each other are incident on the same plane of the single rotating polygon mirror 118 and scanned, so that nonuniformity between the brightness in the left part and the brightness in the right part can be prevented.

Figure 17:
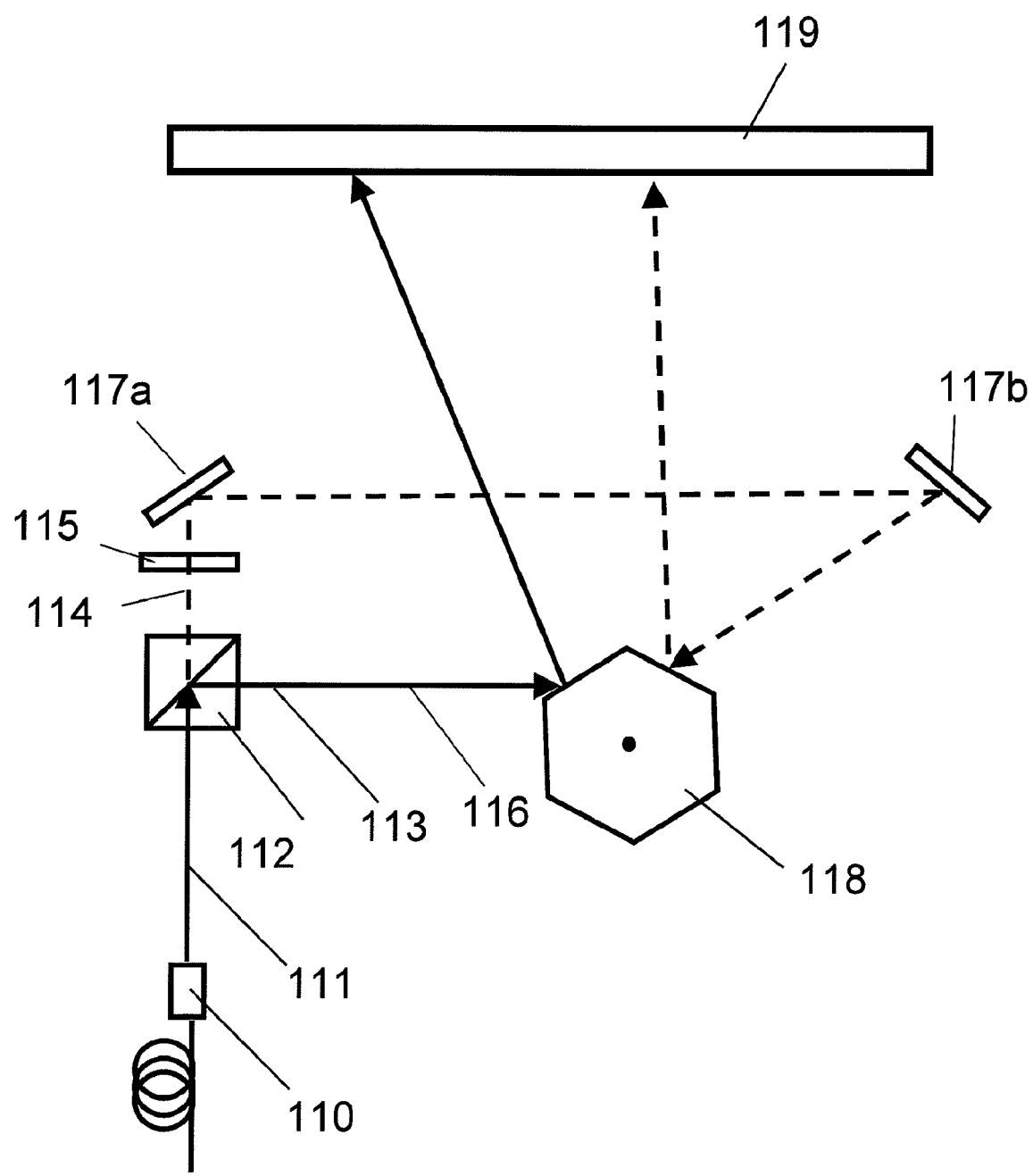
FIG. 17 is a diagram showing another configuration of the optical scanning device according to the fifth embodiment of the present invention.

As shown in FIG. 17, two redirecting mirrors 117a and 117b may be used for making the s-polarized light 113 and the p-polarized light 114 reach different surfaces of the rotating polygon mirror 118.

In addition, by shifting one or both of a position and an angle of the beam made incident on the rotating polygon mirror 118, the same area on the light guide plate 119 can be scanned by the respective beams at different timings. This provides an advantage that speckle noise is unlikely to be visually observed on an image. Moreover, at this time, by appropriately selecting the incident angle and the incident position, ranges on the light guide plate scanned by the respective beams can be made the same, which can suppress a loss of amount of light to the minimum.

Further, in the fifth embodiment described above, the rotating polygon mirror 118 is adopted as a deflection section, but another type of minor, such as a galvanometer mirror or an MEMS mirror, may be adopted. In such a case, concurrent deflections on a plurality of surfaces as shown in FIG. 17 cannot be performed. Thus, two laser lights incident on the same deflecting surface can be made different from each other in one or both of the incident angle and the incident position.

Sixth Embodiment

Figure 18:
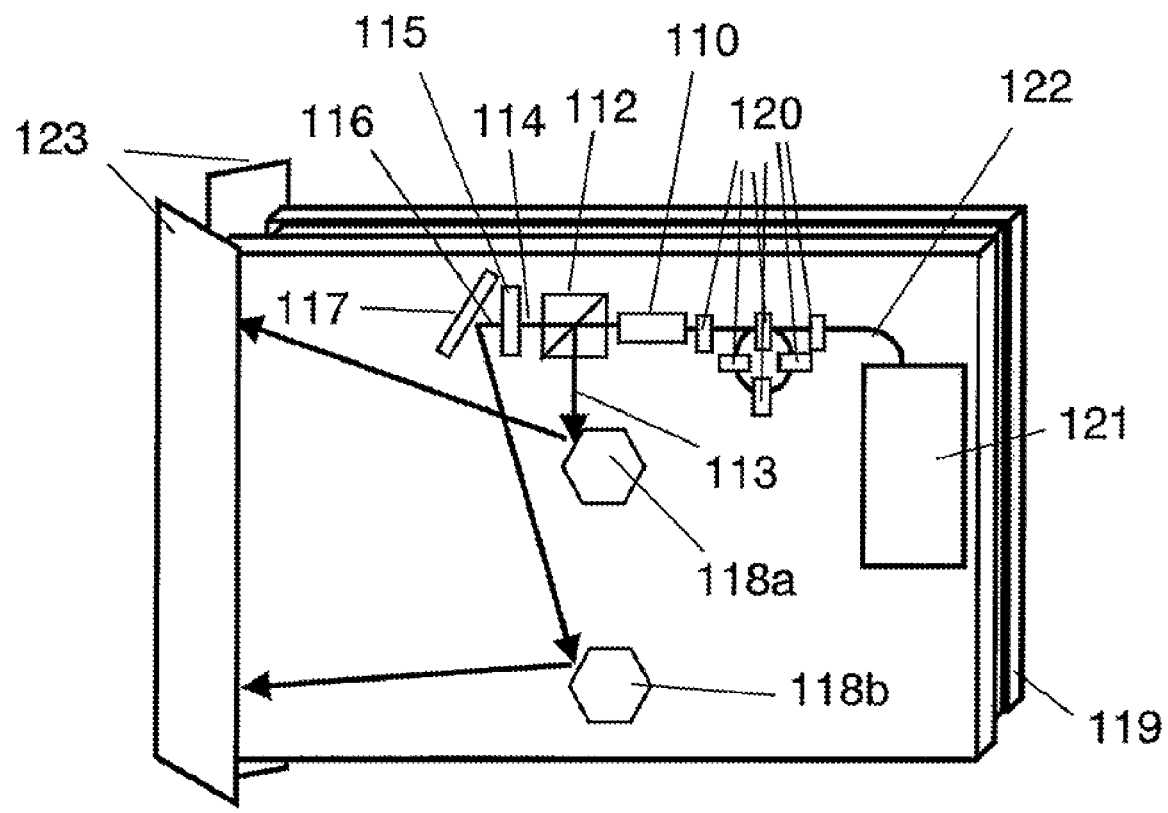
FIG. 18 is a diagram showing a configuration of an optical scanning device according to a sixth embodiment of the present invention.

FIG. 18 is a diagram showing a configuration of an optical scanning device according to a sixth embodiment of the present invention. The optical scanning device according to the sixth embodiment includes a light source unit 121, a fixture 120, a fiber light source 110, a PBS 112, a wave plate 115, redirecting mirrors 117 and 123, rotating polygon minors 118a and 118b, and a light guide plate 119.

A laser light emitted from the light source unit 121 is, via an optical fiber cable 122 fixed by the fixture 120, inputted to the fiber light source 110. The fiber light source 110 outputs a randomly-polarized laser light 111 in which polarization directions are not aligned. The laser light 111 is, through the PBS 112, separated into the s-polarized light 113 and the p-polarized light 114. The s-polarized light 113 is emitted to the rotating polygon minor 118a, and reflected by the rotating polygon minor 118a, to be inputted, via the redirecting mirror 123, to the light guide plate 119. The p-polarized light 114 has the polarization direction thereof being rotated by 90 degrees through the wave plate 115, and thus becomes an s-polarized light which is then reflected by the redirecting mirror 117, to reach the rotating polygon mirror 118b. This s-polarized light is reflected by the rotating polygon mirror 118b, and inputted, via the redirecting mirror 123, to the light guide plate 119. Needless to say, the paths of the s-polarized light 113 and the p-polarized light 114 may be interchanged.

The laser light incident on the light guide plate 119 is diffused, to illuminate a liquid crystal panel from the rear surface side thereof. In this configuration, the laser light deflected by the rotating polygon mirror 118a and the laser light deflected by the rotating polygon mirror 118b separately scan upper and lower parts of the light guide plate 119, respectively. However, regions of the respective laser light may overlap each other. In the configuration of the sixth embodiment, as described in the fifth embodiment above, different amounts of laser lights reach the left part and the right part of the light guide plate 119, respectively, due to the difference in transmissivity between the s-polarized light 113 and the p-polarized light 114 through the PBS 112, a transmission loss in the wave plate 115, a reflection loss in the redirecting mirror 117, the difference in reflectance between the rotating polygon mirrors 118a and 118b, and the like.

However, in the configuration of the sixth embodiment, by fixing the optical fiber cable 122 with the fixture 120, that is, by bending the optical fiber cable 122 in a certain direction by applying pressure thereto, the polarization of the laser light inputted to the fiber light source 110 can be made imbalanced. This principle is used for maintaining the polarization of a single mode fiber. That is, in FIG. 18, in a case where different amounts of lights reach the left and right parts of the light guide plate 119, respectively, the proportion of the polarization component oriented to where the amount of light is smaller can be increased by fixing the optical fiber cable 122 being bent in a predetermined direction. As a result, the amounts of laser lights reaching the left and right parts of the light guide plate 119 can be adjusted so as to coincide with each other.

As described above, in the optical scanning device according to the sixth embodiment of the present invention, by fixing the optical fiber cable 122 with the fixture 120, the amounts of laser lights reaching the left and right parts of the light guide plate 119 can be adjusted so as to coincide with each other.

Figure 19:
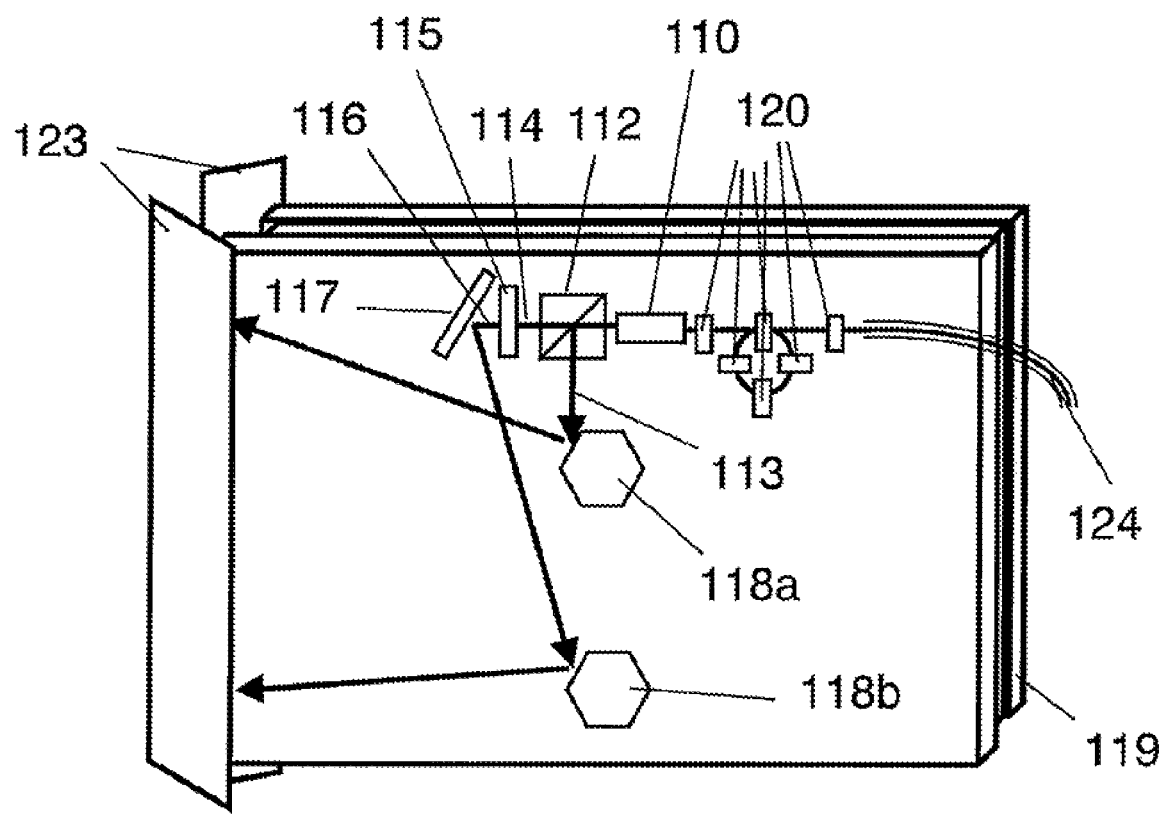
FIG. 19 is a diagram showing another configuration of the optical scanning device according to the sixth embodiment of the present invention.

When the optical fiber cable is provided outside the optical scanning device, the fiber cannot be fixed. In such a case, as shown in FIG. 19, an optical fiber cable 124 with a reinforcer may be used as the optical fiber cable, to make the fiber difficult to move.

In the sixth embodiment described above, the rotating polygon mirrors 118a and 118b are used as the deflection section. However, another type of mirror, such as a galvanometer mirror or an MEMS mirror, may be used. Moreover, the redirecting mirror 117 may have a power so as to condense the light and scan the side surface of the light guide plate 119.

Figure 20:
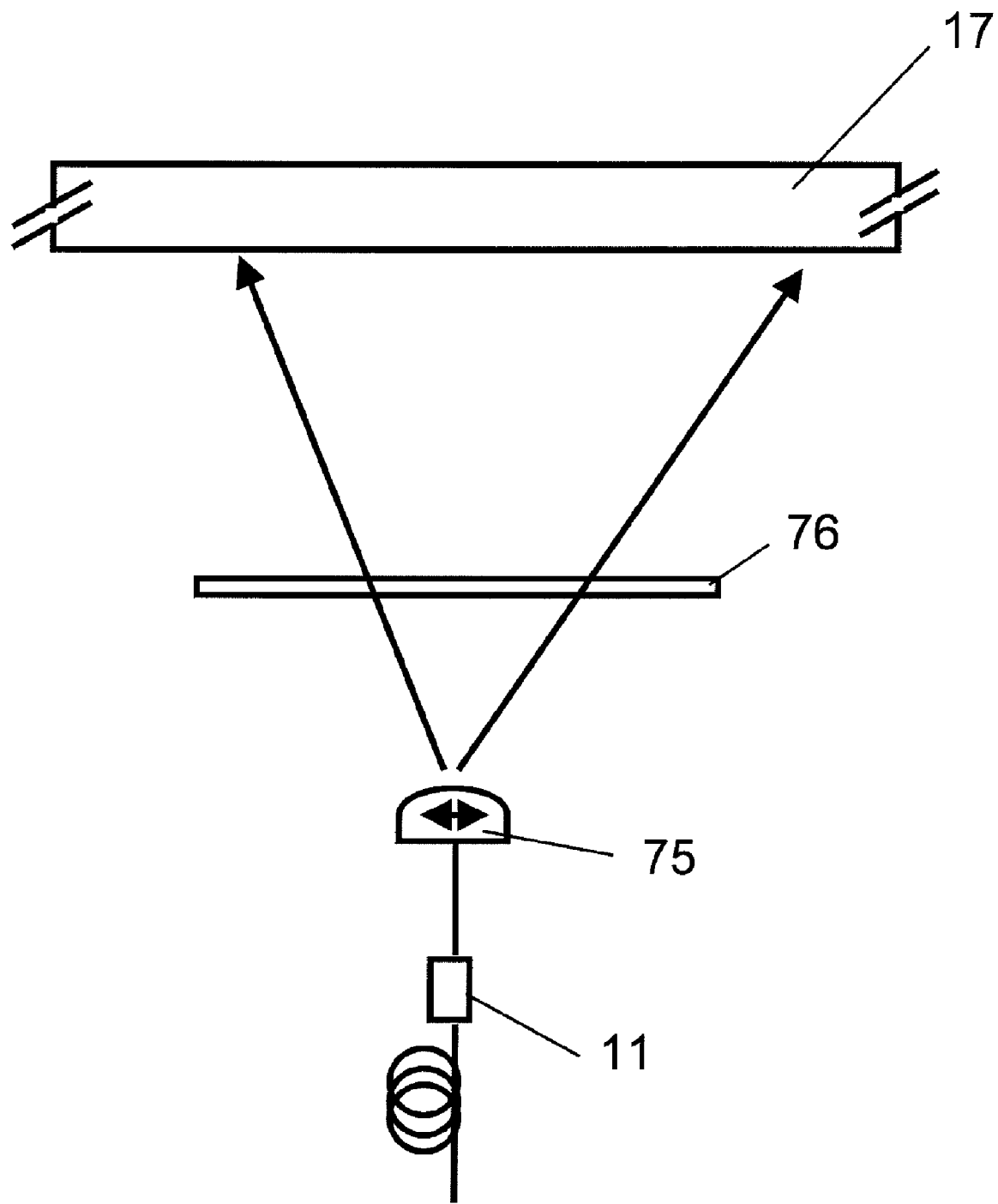
FIG. 20 is a diagram showing a configuration of an optical scanning device according to another embodiment of the present invention.

A lens is also adoptable as the deflection section for use in the optical scanning devices according to the first to sixth embodiments. FIG. 20 is a diagram showing an exemplary configuration of an optical scanning device which adopts a lens as the deflection section. In FIG. 20, a laser light emitted from the laser light source 11 is incident on a lens 75 which has a positive or negative power. The lens 75 is, for example, a general-purpose spherical lens, a cylindrical lens having a power in the scanning direction, or the like. When the lens 75 is vibrated in the scanning direction, the laser light is refracted on a curved surface of the lens, so that a traveling direction of the laser light changes. Thus, scanning of the laser light can be performed. The laser light passing through the lens 75 is, via the scanning lens 76, condensed in the thickness direction of the light guide plate 17.

The optical scanning device of the present invention can be used for a two-dimensional image display device such as a liquid crystal display device, and is applicable to a case where it is desirable that linear optical scanning is performed in a stable and uniform manner by using a high-brightness light source, and the like.

The invention claimed is:

1. An optical scanning device, comprising:
   at least one laser light source for emitting a laser light;
   a deflection section for deflecting and scanning the laser light emitted from the at least one laser light source; and
   a light guide plate of which a side surface is irradiated with the laser light deflected and scanned by the deflection section,
   wherein the laser light with which the side surface of the light guide plate is irradiated enters the light guide plate through the side surface and exits the light guide plate through a front surface of the light guide plate,
   the laser light is scanned at the side surface of the light guide plate with a longitudinal direction of the side surface as a scanning direction,
   the at least one laser light source includes a multi-mode fiber light source, or a broad-stripe semiconductor laser light source which is arranged such that a vertical direction of a stripe structure is parallel to the scanning direction, and
   an exit pupil in a thickness direction, which is perpendicular to the scanning direction, is formed at least in one area on the side surface of the light guide plate.

2. The scanning device according to claim 1, wherein the deflection section is a rotating polygon mirror, and
   a laser light emitted from an end portion, in the thickness direction, of the laser light source has a principal ray thereof intersecting a lens axis at least at one point on each mirror surface of the rotating polygon mirror.

3. The scanning device according to claim 1, further comprising:
   a mirror which has a power and is arranged between the deflection section and the light guide plate.

4. The scanning device according to claim 1, further comprising:
   a thickness-direction light condenser for condensing, in the thickness direction, the laser light deflected and scanned by the deflection section, so as to form the exit pupil at least in one area on the side surface of the light guide plate,
   wherein the thickness-direction light condenser includes a plurality of Fresnel lenses or a plurality of Fresnel mirrors being arranged in the scanning direction, the plurality of Fresnel lenses or the plurality of Fresnel mirrors having different powers at least in the thickness direction.

5. The optical scanning device according to claim 1, further comprising:
   a thickness-direction light condenser for condensing, in the thickness direction, the laser light deflected and scanned by the deflection section, so as to form the exit pupil at least in one area on the side surface of the light guide plate,
   wherein the thickness-direction light condenser includes a plurality of Fresnel lenses or a plurality of Fresnel mirrors being arranged in the scanning direction, the plurality of Fresnel lenses or the plurality of Fresnel mirrors having different powers at least in the thickness direction and being set such that a focal length in the thickness direction becomes larger at a position closer to an end of a scanning range than a position closer to the center of the scanning range.

6. The optical scanning device according to claim 1, further comprising:
a thickness-direction light condenser for condensing, in the thickness direction, the laser light deflected and scanned by the deflection section, so as to form the exit pupil at least in one area on the side surface of the light guide plate,
wherein the thickness-direction light condenser includes plurality of identical Fresnel lenses or a plurality of identical Fresnel mirrors being arranged in the scanning direction and laterally-symmetrically with respect to the center of a scanning range, the plurality of Fresnel lenses or the plurality of Fresnel mirrors having different powers at least in the thickness direction.

7. The optical scanning device according to claim 1, further comprising:
a thickness-direction light condenser for condensing, in the thickness direction, the laser light deflected and scanned by the deflection section, so as to form the exit pupil at least in one area on the side surface of the light guide plate,
wherein the thickness-direction light condenser includes a plurality of Fresnel lenses or a plurality of Fresnel mirrors being arranged in the scanning direction, the plurality of Fresnel lenses or the plurality of Fresnel mirrors having different powers at least in the thickness direction and the same thickness.

8. The optical scanning device according to claim 1, further comprising:
a thickness-direction light condenser for condensing, in the thickness direction, the laser light deflected and scanned by the deflection section, so as to form the exit pupil at least in one area on the side surface of the light guide plate,
wherein the thickness-direction light condenser includes a plurality of Fresnel lenses or a plurality of Fresnel mirrors being arranged in the scanning direction, the plurality of Fresnel lenses or the plurality of Fresnel mirrors having a different powers at least in the thickness direction and being formed of the same material.

9. The optical scanning device according to claim 1, further comprising:
a thickness-direction light condenser for condensing, in the thickness direction, the laser light deflected and scanned by the deflection section, so as to form the exit pupil at least in one area on the side surface of the light guide plate,
wherein the thickness-direction light condenser includes a plurality of Fresnel lenses being arranged in the scanning direction, the plurality of Fresnel lenses having different powers at least in the thickness direction and being linear Fresnel lenses which are at regular pitches in the thickness direction.

10. The optical scanning device according to claim 1, further comprising:
a thickness-direction light condenser for condensing, in the thickness direction, the laser light deflected and scanned by the deflection section, so as to form the exit pupil at least in one area on the side surface of the light guide plate,
wherein the thickness-direction light condenser includes a plurality of Fresnel mirrors being arranged in the scanning direction, the plurality of Fresnel mirrors having different powers at least in the thickness direction and being linear Fresnel mirrors which are at regular pitches in the thickness direction.

11. A two-dimensional image display device, comprising:
a spatial modulation element for two-dimensionally modulating light intensity; and
the optical scanning device according to claim 1, for illuminating the spatial modulation element.

12. An optical scanning device, comprising:
at least one laser light source for emitting a laser light;
a deflection section for deflecting and scanning the laser light emitted from the at least one laser light source; and
a light guide plate of which a side surface is irradiated with the laser light deflected and scanned by the deflection section,
wherein the laser light with which the side surface of the light guide plate is radiated enters the light guide plate through the side surface and exits the light guide plate through a front surface of the light guide plate,
the laser light is scanned at the side surface of the light guide plate with a longitudinal direction of the side surface as a scanning direction, and
the laser light emitted from the at least one laser light source is, on the deflection section, condensed in a scanning direction perpendicular to a thickness direction guide plate.

13. A two-dimensional image display, comprising:
a spatial modulation element for two-dimensionally modulating light intensity; and
the optical scanning device according to claim 11, for illuminating the spatial modulation element.

* * * * *